US007730082B2

(12) United States Patent
Sah et al.

(10) Patent No.: US 7,730,082 B2
(45) Date of Patent: Jun. 1, 2010

(54) REMOTE MODULE INCORPORATION INTO A CONTAINER DOCUMENT

(75) Inventors: Adam Sah, Santa Cruz, CA (US); Dylan Parker, Victoria (CA); Christopher H. Rohrs, Mountain View, CA (US); Jessica Lynn Gray, Mountain View, CA (US); Steven L. Goldberg, San Carlos, CA (US)

(73) Assignee: Google Inc., Mountain View, CA (US)

( * ) Notice: Subject to any disclaimer, the term of this patent is extended or adjusted under 35 U.S.C. 154(b) by 894 days.

(21) Appl. No.: 11/298,930

(22) Filed: Dec. 12, 2005

(65) Prior Publication Data

US 2007/0136320 A1 Jun. 14, 2007

(51) Int. Cl.
G06F 7/00 (2006.01)
G06F 17/30 (2006.01)

(52) U.S. Cl. .................... 707/770; 709/217

(58) Field of Classification Search ........... 707/1–10, 707/100–104.1, 200–206; 709/201–222
See application file for complete search history.

(56) References Cited

U.S. PATENT DOCUMENTS

| | | | |
|---|---|---|---|
| 5,470,233 A | 11/1995 | Fruchterman et al. |
| 5,537,526 A | 7/1996 | Anderson et al. |
| 5,581,686 A | 12/1996 | Koppolu et al. |
| 5,613,058 A | 3/1997 | Koppolu et al. |
| 5,634,019 A | 5/1997 | Koppolu et al. |
| 5,636,346 A | 6/1997 | Saxe |
| 5,640,579 A | 6/1997 | Koppolu et al. |
| 5,724,521 A | 3/1998 | Dedrick et al. |
| 5,754,175 A | 5/1998 | Koppolu et al. |
| 5,801,701 A | 9/1998 | Koppolu et al. |
| 5,812,862 A | 9/1998 | Smith et al. |
| 5,835,919 A | 11/1998 | Stern et al. |
| 5,845,265 A | 12/1998 | Woolston |
| 5,845,281 A | 12/1998 | Benson et al. |
| 5,910,804 A | 6/1999 | Fortenbery et al. |
| 5,918,010 A | 6/1999 | Appleman et al. |
| 5,920,854 A | 7/1999 | Kirsch et al. |
| 5,931,901 A | 8/1999 | Wolfe et al. |

(Continued)

FOREIGN PATENT DOCUMENTS

EP 1 026 610 8/2000

(Continued)

OTHER PUBLICATIONS

Krieger et al., The emergence of distributed component platforms, Mar. 1998, IEEE, 43-53.*

(Continued)

Primary Examiner—Jean B Fleurantin
(74) Attorney, Agent, or Firm—Fish & Richardson P.C.

(57) ABSTRACT

A system and method for serving content in a container document. The system comprises a container server that identifies one or more modules for use with a container document, receives a module specification from a remote server, and serves the container document including module data based on the module specification. The module specification comprises a content element and one or more optional preference elements that enable the container server to provide preferences to the module.

52 Claims, 15 Drawing Sheets

U.S. PATENT DOCUMENTS

| | | | |
|---|---|---|---|
| 5,974,398 | A | 10/1999 | Hanson et al. |
| 6,026,368 | A | 2/2000 | Brown et al. |
| 6,044,375 | A | 3/2000 | Shmueli et al. |
| 6,061,659 | A | 5/2000 | Murray |
| 6,067,570 | A | 5/2000 | Kreynin et al. |
| 6,078,866 | A | 6/2000 | Buck et al. |
| 6,134,552 | A | 10/2000 | Fritz et al. |
| 6,223,163 | B1 | 4/2001 | Van Luchene |
| 6,247,009 | B1 | 6/2001 | Shiiyama et al. |
| 6,253,189 | B1 | 6/2001 | Feezell et al. |
| 6,269,361 | B1 | 7/2001 | Davis et al. |
| 6,285,987 | B1 | 9/2001 | Roth et al. |
| 6,298,348 | B1 | 10/2001 | Eldering |
| 6,324,519 | B1 | 11/2001 | Eldering |
| 6,336,132 | B2 | 1/2002 | Appleman et al. |
| 6,421,675 | B1 | 7/2002 | Ryan et al. |
| 6,473,800 | B1 | 10/2002 | Jerger et al. |
| 6,601,057 | B1 | 7/2003 | Underwood et al. |
| 6,677,894 | B2 | 1/2004 | Sheynblat et al. |
| 6,681,371 | B1 | 1/2004 | Devabu |
| 6,691,114 | B1 | 2/2004 | Nakamura |
| 6,813,640 | B1 | 11/2004 | Benson et al. |
| 6,912,532 | B2 * | 6/2005 | Andersen ............. 707/10 |
| 6,976,210 | B1 | 12/2005 | Silva et al. |
| 7,089,248 | B1 | 8/2006 | King et al. |
| 7,103,642 | B1 | 9/2006 | Chen et al. |
| 7,167,903 | B2 | 1/2007 | Percival |
| 7,234,107 | B1 | 6/2007 | Aoki et al. |
| 7,281,060 | B2 | 10/2007 | Hofmann et al. |
| 7,290,006 | B2 * | 10/2007 | Xie et al. ............. 707/102 |
| 7,376,907 | B2 | 5/2008 | Santoro et al. |
| 7,395,322 | B2 | 7/2008 | Harvey et al. |
| 7,441,185 | B2 | 10/2008 | Coulson et al. |
| 7,490,295 | B2 | 2/2009 | Chaudhri et al. |
| 2001/0042064 | A1 | 11/2001 | Davis et al. |
| 2001/0047297 | A1 | 11/2001 | Wen |
| 2001/0051911 | A1 | 12/2001 | Marks et al. |
| 2002/0002509 | A1 | 1/2002 | Wagorn et al. |
| 2002/0002525 | A1 | 1/2002 | Arai et al. |
| 2002/0026359 | A1 | 2/2002 | Long et al. |
| 2002/0031230 | A1 | 3/2002 | Sweet et al. |
| 2002/0035536 | A1 | 3/2002 | Gellman |
| 2002/0038282 | A1 | 3/2002 | Montgomery |
| 2002/0046099 | A1 | 4/2002 | Frengut et al. |
| 2002/0046104 | A1 | 4/2002 | Kaddeche et al. |
| 2002/0046245 | A1 | 4/2002 | Hillar et al. |
| 2002/0077891 | A1 | 6/2002 | Castle et al. |
| 2002/0087667 | A1 | 7/2002 | Andersen |
| 2002/0091736 | A1 | 7/2002 | Wall |
| 2002/0099605 | A1 | 7/2002 | Weitzman et al. |
| 2002/0111898 | A1 | 8/2002 | Numaoka et al. |
| 2002/0123988 | A1 | 9/2002 | Dean et al. |
| 2002/0143819 | A1 | 10/2002 | Han et al. |
| 2002/0152197 | A1 | 10/2002 | Stocker et al. |
| 2002/0156812 | A1 | 10/2002 | Krasnoiarov et al. |
| 2002/0165773 | A1 | 11/2002 | Natsuno et al. |
| 2002/0184097 | A1 | 12/2002 | Hijiri et al. |
| 2002/0184343 | A1 | 12/2002 | Ashcroft |
| 2002/0194062 | A1 | 12/2002 | Linde |
| 2002/0198780 | A1 | 12/2002 | Kawakami et al. |
| 2003/0028896 | A1 | 2/2003 | Swart et al. |
| 2003/0037334 | A1 | 2/2003 | Khoo et al. |
| 2003/0070167 | A1 | 4/2003 | Holtz et al. |
| 2003/0083937 | A1 | 5/2003 | Hasegawa et al. |
| 2003/0126136 | A1 | 7/2003 | Omoigui |
| 2003/0149618 | A1 | 8/2003 | Sender et al. |
| 2003/0163372 | A1 | 8/2003 | Kolsy |
| 2003/0216963 | A1 | 11/2003 | Ishiwaka et al. |
| 2003/0236729 | A1 | 12/2003 | Epstein et al. |
| 2004/0015397 | A1 | 1/2004 | Barry et al. |
| 2004/0019523 | A1 | 1/2004 | Barry et al. |
| 2004/0024815 | A1 | 2/2004 | Park et al. |
| 2004/0044571 | A1 | 3/2004 | Bronnimann et al. |
| 2004/0054577 | A1 | 3/2004 | Inoue et al. |
| 2004/0054589 | A1 | 3/2004 | Nicholas et al. |
| 2004/0059708 | A1 | 3/2004 | Dean et al. |
| 2004/0059712 | A1 | 3/2004 | Dean et al. |
| 2004/0093327 | A1 | 5/2004 | Anderson et al. |
| 2004/0093620 | A1 | 5/2004 | Lino et al. |
| 2004/0119740 | A1 | 6/2004 | Chang et al. |
| 2004/0139049 | A1 | 7/2004 | Hancock et al. |
| 2004/0143499 | A1 | 7/2004 | Dietsch et al. |
| 2004/0143843 | A1 | 7/2004 | Khoo et al. |
| 2004/0150673 | A1 * | 8/2004 | Dobronsky ............. 345/810 |
| 2004/0153508 | A1 | 8/2004 | Alcorn et al. |
| 2004/0167928 | A1 | 8/2004 | Anderson et al. |
| 2004/0249709 | A1 | 12/2004 | Donovan et al. |
| 2005/0065806 | A1 | 3/2005 | Harik |
| 2005/0071224 | A1 | 3/2005 | Fikes et al. |
| 2005/0096979 | A1 | 5/2005 | Koningstein |
| 2005/0131758 | A1 | 6/2005 | Desikan et al. |
| 2005/0131762 | A1 | 6/2005 | Bharat et al. |
| 2005/0144069 | A1 | 6/2005 | Wiseman et al. |
| 2005/0198120 | A1 | 9/2005 | Reshef et al. |
| 2005/0216335 | A1 | 9/2005 | Fikes et al. |
| 2005/0222900 | A1 | 10/2005 | Fuloria et al. |
| 2005/0222903 | A1 | 10/2005 | Buchheit et al. |
| 2005/0222989 | A1 | 10/2005 | Haveliwala et al. |
| 2005/0223002 | A1 | 10/2005 | Agarwal et al. |
| 2006/0074913 | A1 | 4/2006 | O'Sullivan et al. |
| 2006/0259860 | A1 | 11/2006 | Kobashi |
| 2007/0083670 | A1 | 4/2007 | Kelley et al. |
| 2007/0106803 | A1 | 5/2007 | Peterson et al. |
| 2008/0082907 | A1 | 4/2008 | Sorotokin et al. |

FOREIGN PATENT DOCUMENTS

| | | |
|---|---|---|
| WO | 00/38074 | 6/2000 |
| WO | 2004/042525 | 5/2004 |

OTHER PUBLICATIONS

Thomas Schaeck., Web Services for Remote Portals (WSRP) Whitepaper, Sep. 22, 2002, Google, 1-18.*

Start, "Start.com Developer Center: Updates and Events", retrieved from the internet at <http://start.com/developer/default.htm, retrieved from the internet on May 23, 2006.

Start, "Start.com Developer Center: Getting Started with Start.com Gadgets", retrieved from the internet at <http://start.com/developer/gettingstarted.aspx, retrieved from the internet on May 23, 2006.

Start, "Start.com Developer Center: Atlas Runtime Reference", retrieved from the internet at <http://start.com/developer/atlasruntime.aspx, retrieved from the internet on May 23, 2006.

Start, "Start.com Developer Center: Binding Reference", retrieved from the internet at <http://start.com/developer/binding_ref.aspx, retrieved from the internet on May 23, 2006.

Techcrunch, "Profile- MSN Start.com", retrieved from the internet at <http://www.techcrunch.com/tag/Start.com/, retrieved from the internet on May 10, 2006.

Richard Macmanus, "Microsoft's Start.com Opens Up", retrieved from the internet at <http://blogs.zdnet.com/web2explorer/?p=9, retrieved from the internet on May 23, 2006.

Yahoo!, "Widgets—Information", retrieved from the internet at <http://widgets.yahoo.com/info, retrieved from the internet on May 23, 2006.

Yahoo!, "Widgets—FAQ", retrieved from the internet at <http://widgets.yahoo.com/faq/, retrieved from the internet on May 23, 2006.

Yahoo!, "Widgets—Basics", retrieved from the internet at <http:widgets.yahoo.com/basics/, retrieved from the internet on May 23, 2006.

Yahoo!, Widgets—Version History, retrieved from the internet at <http://widgets.yahoo.com/versionhistory/, retrieved from the internet on May 23, 2006.

Yahoo!, "Konfabulator—Gallery", retrieved from the internet at <http://www.widgetgallery.com, retrieved from the internet on May 23, 2006.
Michael Arrington, "Profile—Konfabulator/ Yahoo Widgets", retrieved from the internet at <http://www.techcrunch.com/tag/Konfabultor/, retrieved from the internet on May 10, 2006.
Apple, "Dashboard: Handy Widgets at your Command", retrieved from the internet at <http://www.apple.com/macosx/features/dashboard/, retrieved from the internet on May 23, 2006.
Apple, "Featured Widget: Art Directors Toolkit Widget", retrieved from the internet at <http://www.apple.com/downloads/dashboard/, retrieved from the internet on May 23, 2006.
Apple Computer, Inc., "Tiger Developer Overview Series: Developing Dashboard Widgets", retrieved from the internet at <http://developer.apple.com/macosx/dashboard.html, retrieved from the internet on May 23, 2006.
DashboardExposed, "Newest Widgets", retrieved from the internet at <http:www.dashboardexposed.com/index/sitelinks-newest-action, retrieved from the internet on May 23, 2006.
Bryan Castle, "Introduction to Web Services for Remore Portlets", retrieved from the internet at <http://www-128.ibm.com,developerworks/library/ws-wsrp/, retrieved from the internet on May 23, 2006.
Sun Microsystems, Inc., "Introduction to JSR 168—The Portlet Specification", retrieved from the internet at<http://developers.sun.com/prodtech/portalserver/reference/techart/jsr168/, retrieved from the internet on May 23, 2006.
Ron Lynn, et al., "Creating a JSR 168 Portlet for Use by Diverse Portals using Web Services for Remote Portlets", retrieved from the internet at <http://www-128.ibm.com/developerworks/websphere/library/tutorials/0510_lynn/0510_lyn..., retrieved from the internet on May 10, 2006.
"JSR 168, WSRP, Portlets & Enterprise Portal", retrieved from the internet at <http://portlets.blogspot.com/, retrieved from the internet on May 23, 2006.
Daniel Rubio, "Web Services, portlets and WSRP", retrieved from the internet at <http://searchwebservices.techtarget.com/tip/1,289483,sid26_gci1134722,00.html, retrieved from the internet on May 23, 2006.
Apple, "Exposé: Find the window you need. Now.", retrieved from the internet at <http://www.apple.com/macosx/features/expose/, retrieved from the internet on May 23, 2006.
Google Introduces New Pricing for Popular Self-Service Online Advertising Program, http://www.google.com/press/pressrel/select.html, p. 1-2, dated Feb. 20, 2002, printed on Jul. 29, 2003.
Collection of pages from www.overture.com, printed on Jul. 29, 2003.
Collection of pages from findwhat.com, http://www.findwhat.com, printed on Jul. 29, 2003.
Collection of pages from Sprinks.com, http://www.sprinks.com, printed on Jul. 29, 2003.
Collection of pages from Kandoodle.com, http://www.kanoodle.com, printed on Jul. 29, 2003.
Collection of pages from Google Advertising, http://www.google.com, printed on Jul. 29, 2003.
Chris Sherman, "Google Launches AdWords Select," Feb. 20, 2002, 6 pages.
Notification of Transmittal of the International Search Report and the Written Opinion of the International Search Authority, or the Declaration (4 pages); Written Opinion of the International Searching Authority (5 pages), and International Search Report (2 pages) for International Application No. PCT/US 06/46973 mailed Mar. 13, 2008.
Notification of Transmittal of the International Search Report and the Written Opinion of the International Search Authority, or the Declaration (4 pages); Written Opinion of the International Searching Authority (4 pages), and Internatioanl Search REport (2 pages) for International Application No. PCT/US 06/46974 mailed Mar. 13, 2008.
Notification of Transmittal of the International Search Report and the Written Opinion of the International Search Authority, or the Declaration (4 pages); Written Opinion of the International Searching Authority (5 pages), and International Search Report (2 pages) for International Application No. PCT/US 06/46975 mailed Mar. 13, 2008.
Notification of Transmittal of the International Search Report and the Written Opinion of the International Search Authority, or the Declaration (4 pages); Written Opinion of the International Searching Authority (6 pages), and International Search Report (2 pages) for International Application No. PCT/US 06/46976 mailed Mar. 13, 2008.
Notification of Transmittal of the International Search Report and the Written Opinion of the International Search Authority, or the Declaration (3 pages); Written Opinion of the International Searching Authority (3 pages), and International Search Report (2 pages) for International Application No. PCT/US 07/13261 mailed Jul. 7, 2008.
Notification of Transmittal of the International Search Report and the Written Opinion of the International Search Authority, or the Declaration (4 pages); Written Opinion of the International Searching Authority (3 pages), and International Search Report (2 pages) for International Application No. PCT/US 07/10788 mailed Jul. 23, 2008.
Notification of Transmittal of the International Search Report and the Written Opinion of the International Searching Authority, or the Declaration (4 pages), Written Opinion of the International Searching Authority (4 pages), and International Search Report (2 pages) for International Application No. PCT/US07/17502 mailed Jul. 17, 2008.
Notification of Transmittal of the International Search Report and the Written Opinion of the International Searching Authority, or the Declaration (1 page), International Search Report (3 pages), and Written Opinion of the International Searching Authority (8 pages) for International Application No. PCT/US07/17503 mailed Sep. 16, 2008 (Total 12 pages).
Examiner's First Report on Patent Application dated Jul. 23, 2008; (2 pages); and correspondence from Australian Patent Office regarding withdrawal of Examination Report dated Jul. 23, 2008 (1 page); all issued in Australian Patent Application No. 20066326623 (3 pages total).
Notification of Transmittal of the International Search Report and the Written Opinion of the International Search Authority, or the Declaration (3 pages); Written Opinion of the International Searching Authority (3 pages), and International Search Report (2 pages) for International Application No. PCT/US 07/13261 mailed Jul. 7, 2008, All Pages.
Google Introduces New Pricing for Popular Self-Service Online Advertising Program, http://www.google.com/press/pressrel/select.html, p. 1-2, dated Feb. 20, 2002, printed on Jul. 29, 2003, All Pages.
Collection of pages from www.overture.com, printed on Jul. 29, 2003, All Pages.
Collection of pages from findwhat.com, http://www.findwhat.com, printed on Jul. 29, 2003, All Pages.
Collection of pages from Sprinks.com, http://www.sprinks.com, printed on Jul. 29, 2003, All Pages.
Collection of pages from Kandoodle.com, http://www.kanoodle.com, printed on Jul. 29, 2003, All Pages.
Collection of pages from Google Advertising, http://www.google.com, printed on Jul. 29, 2003, All Pages.
Chris Sherman, "Google Launches AdWords Select," Feb. 20, 2002, 6 pages, All Pages.
Notification of Transmittal of the International Search Report and the Written Opinion of the International Search Authority, or the Declaration (4 pages); Written Opinion of the International Searching Authority (5 pages), and International Search Report (2 pages) for International Application No. PCT/US 06/46973 mailed Mar. 13, 2008, All Pages.
Notification of Transmittal of the International Search Report and the Written Opinion of the International Search Authority, or the Declaration (4 pages); Written Opinion of the International Searching Authority (4 pages), and International Search Report (2 pages) for International Application No. PCT/US 06/46974 mailed Mar. 13, 2008, All Pages.
Notification of Transmittal of the International Search Report and the Written Opinion of the International Search Authority, or the Declaration (4 pages); Written Opinion of the International Searching Authority (5 pages), and International Search Report (2 pages) for International Application No. PCT/US 06/46975 mailed Mar. 13, 2008, All Pages.

Notification of Transmittal of the International Search Report and the Written Opinion of the International Searching Authority, or the Declaration (1 page), International Search Report (3 pages), and Written Opinion of the International Searching Authority (8 pages) for International Application No. PCT/US07/17503 mailed Sep. 16, 2008 (Total 12 pages), All Pages.

Examiner's First Report on Patent Application dated Jul. 23, 2008; (2 pages); and correspondence from Australian Patent Office regarding withdrawal of Examination Report dated Jul. 23, 2008 (1 page); all issued in Australian Patent Application No. 20066326623 (3 pages total), All Pages.

Notification of Transmittal of the International Search Report and the Written Opinion of the International Search Authority, or the Declaration (4 pages); Written Opinion of the International Searching Authority (3 pages), and International Search Report (2 pages) for International Application No. PCT/US 07/10788 mailed Jul. 23, 2008, All Pages.

Notification of Transmittal of the International Search Report and the Written Opinion of the International Searching Authority, or the Declaration (4 pages), Written Opinion of the International Searching Authority (4 pages), and International Search Report (2 pages) for International Application No. PCT/US07/17502 mailed Jul. 17, 2008, All Pages.

Start, "Start.com Developer Center: Updates and Events", retrieved from the internet at <http://start.com/developer/default.htm, retrieved from the internet on May 23, 2006, All Pages.

Start, "Start.com Developer Center: Getting Started with Start.com Gadgets", retrieved from the internet at <http://start.com/developer/gettingstarted.aspx, retrieved from the internet on May 23, 2006, All Pages.

Start, "Start.com Developer Center: Atlas Runtime Reference", retrieved from the internet at <http://start.com/developer/atlasruntime.aspx, retrieved from the internet on May 23, 2006, All Pages.

Start, "Start.com Developer Center: Binding Reference", retrieved from the internet at <http://start.com/developer/binding_ref.aspx, retrieved from the internet on May 23, 2006, All Pages.

Techcrunch, "Profile- MSN Start.com", retrieved from the internet at <http://www.techcrunch.com/tag/Start.com/, retrieved from the internet on May 10, 2006, All Pages.

Richard Macmanus, "Microsoft's Start.com Opens Up", retrieved from the internet at <http://blogs.zdnet.com/web2explorer/?p=9, retrieved from the internet on May 23, 2006, All Pages.

Yahoo!, "Widgets—Information", retrieved from the internet at <http://widgets.yahoo.com/info, retrieved from the internet on May 23, 2006, All Pages.

Yahoo!, "Widgets—FAQ", retrieved from the internet at <http://widgets.yahoo.com/faq/, retrieved from the internet on May 23, 2006, All Pages.

Yahoo!, "Widgets—Basics", retrieved from the internet at <http:widgets.yahoo.com/basics/, retrieved from the internet on May 23, 2006, All Pages.

Yahoo!, Widgets—Version History, retrieved from the internet at <http://widgets.yahoo.com/versionhistory/, retrieved from the internet on May 23, 2006, All Pages.

Yahoo!, "Konfabulator—Gallery", retrieved from the internet at <http://www.widgetgallery.com, retrieved from the internet on May 23, 2006.

Michael Arrington, "Profile—Konfabulator/ Yahoo Widgets", retrieved from the internet at <http://www.techcrunch.com/tag/Konfabultor/, retrieved from the internet on May 10, 2006, All Pages.

Apple, "Dashboard: Handy Widgets at your Command", retrieved from the internet at <http://www.apple.com/macosx/features/dashboard/, retrieved from the internet on May 23, 2006, All Pages.

Apple, "Featured Widget: Art Directors Toolkit Widget", retrieved from the internet at <http://www.apple.com/downloads/dashboard/, retrieved from the internet on May 23, 2006, All Pages.

Apple Computer, Inc., "Tiger Developer Overview Series: Developing Dashboard Widgets", retrieved from the internet at <http://developer.apple.com/macosx/dashboard.html, retrieved from the internet on May 23, 2006, All Pages.

DashboardExposed, "Newest Widgets", retrieved from the internet at <http:www.dashboardexposed.com/index/sitelinks-newest-action, retrieved from the internet on May 23, 2006, All Pages.

Bryan Castle, "Introduction to Web Services for Remore Portlets", retrieved from the internet at <http://www-128.ibm.com,developerworks/library/ws-wsrp/, retrieved from the internet on May 23, 2006, All Pages.

Sun Microsystems, Inc., "Introduction to JSR 168—The Portlet Specification", retrieved from the internet at<http://developers.sun.com/prodtech/portalserver/reference/techart/jsr168/, retrieved from the internet on May 23, 2006, All Pages.

Ron Lynn, et al., "Creating a JSR 168 Portlet for Use by Diverse Portals using Web Services for Remote Portlets", retrieved from the internet at <http://www-128.ibm.com/developerworks/websphere/library/tutorials/0510_lynn/0510_lyn..., retrieved from the internet on May 10, 2006, All Pages.

"JSR 168, WSRP, Portlets & Enterprise Portal", retrieved from the internet at <http://portlets.blogspot.com/, retrieved from the internet on May 23, 2006, All Pages.

Daniel Rubio, "Web Services, portlets and WSRP", retrieved from the internet at <http://searchwebservices.techtarget.com/tip/1,289483,sid26_gci1134722,00.html, retrieved from the internet on May 23, 2006, All Pages.

Apple, "Exposé: Find the window you need. Now.", retrieved from the internet at <http://www.apple.com/macosx/features/expose/, retrieved from the internet on May 23, 2006, All Pages.

Notification of Transmittal of the International Search Report and the Written Opinion of the International Search Authority, or the Declaration (4 pages); Written Opinion of the International Searching Authority (6 pages), and International Search Report (2 pages) for International Application No. PCT/US 06/46976 mailed Mar. 13, 2008, All Pages.

Julio Ojeda-Zapata. "Wild about widgets: Tiny computer programs are 'where the Web and the desktop meet.'" Knight Ridder Tribune News Service. Aug. 24, 2005. ProQuest Newsstand, ProQuest Web. Sep. 13, 2009, All Pages.

U.S. Appl. No. 11/298,930 Non-Final Office Action dated Feb. 18, 2009, All Pages.

U.S. Appl. No. 11/298,930 Response to Non-Final Office Action filed May 18, 2009, All Pages.

U.S. Appl. No. 11/298,930 Final Office Action dated Aug. 18, 2009, All Pages.

* cited by examiner

MODULE SPEC

```
<?XML VERSION INFO>

<MODULE>

<MODULEPREFS>    (OPTIONAL)    </MODULEPREFS>
    <USERPREFS>      (OPTIONAL)    </USERPREFS>

<CONTENT type = "_____">

</CONTENT>

</MODULE>
```

Fig. 5

EXAMPLE WEB PAGE CONTAINING MODULE SPEC

```
<HTML>

... (OTHER HTML CODE HERE) ...

<!--
<?XML VERSION = "1.0" encoding = "UTF-8"?>

<MODULE>

<CONTENT type = "html">
    Hello, world!
    </CONTENT>
</MODULE>
-->

</HTML>
```

Fig. 6

EXAMPLE WEB PAGE CONTAINING MODULE SPEC ALTERED

```
<HTML>

... (OTHER HTML CODE HERE) ...

<!--
<?xml version="1.0" encoding="UTF-
8" ?> <br><Module><br> <ModulePrefs
title="hello world example" /> <br>
<Content type="html"><![CDATA[<br>
Hello, world!<br> ]]></Content> <br></Module>
-->

</HTML>
```

Fig. 6(b)

PREFERENCES

```
Bob Brown
        012345    www.smith.com/module.xml
                  name = bob         color = blue
                  sandwich = reuben 012359    www.abc123.com/module.xml
                  name = bob         zip = 23123
                  stock = GOOG, ABC, GE 014572    www.anothersiste.com/mobile.xml
                  name = bob         login = bbrown
                  password = XY1235
Steve Jones
        012345    www.smith.com/module.xml
                  name = steve       color = green 015678    www.abc123.com/module.xml
                  name = steve
```

REMOTE MODULE INCORPORATION INTO A CONTAINER DOCUMENT

FIELD OF THE INVENTION

Embodiments of the present invention relate to incorporating remote modules into a container document.

BACKGROUND OF THE INVENTION

Many websites offer users the capability to personalize a homepage. Such websites have typically offered the user the opportunity to include predefined sections of information or data in a predefined presentation format selected from choices designed and incorporated by the website operator. The user of such systems typically may personalize the content within the sections, such as selecting specific stocks to include in a section showing stock prices. These personalized home pages provide very limited flexibility.

This and other drawbacks exist with current systems.

SUMMARY OF THE INVENTION

Accordingly, various exemplary embodiments of the present inventions may be directed to a system that serves content in a container document. The system comprises a container server that identifies one or more modules for use with a container document, receives a module specification from a remote server, and serves the container document including module data based on the module specification. The module specification comprises a content element and one or more optional preference elements that enable the container server to provide preferences to the module.

According to another embodiment, a method may comprise identifying one or more modules for use with a container document, receiving a module specification from a remote server, providing module data in the container document based on the module specification, and wherein the container server serves the container document including the module data.

According to another embodiment, a system comprises a module specification server that serves a module specification to a remote container server for use in generating module data in a container document, wherein the module specification comprises a format defined by the remote container server for the container document.

According to another embodiment, a system comprises a container server that identifies one or more modules for use with a container document based on a URL associated with the container document, a module server that receives a module specification from the URL over the Internet and generates data to the container server. The container server may include module data in a container document.

According to another exemplary embodiment, a system that serves content in a container document comprises a container server that identifies one or more modules for use with a container document and a receiving server that receives data from a remote server, identifying a module specification from the data, and providing module data to the container server based on the module specification. The container server may server the container document including the module data.

According to another exemplary embodiment, a method for serving content comprises identifying one or more modules for use with a container document, receiving data from a remote server, identifying a module specification from the data, providing module data in the container document based on the module specification, and wherein the container server serves the container document including the module data.

Other embodiments may be considered.

BRIEF DESCRIPTION OF THE DRAWINGS

FIG. 5 depicts an illustrative module specification format according to an embodiment of the present invention.

FIG. 6 depicts an example of data containing a module specification according to an embodiment of the present invention.

FIG. 6(b) depicts an example of data containing an altered module specification according to an embodiment of the present invention.

FIG. 10 depicts an illustrative listing of the types of preference information that may be stored according to an embodiment of the present invention.

FIG. 13 depicts an illustrative container document containing modules with output generated through a proxy server module according to an embodiment of the present invention.

DETAILED DESCRIPTION OF EXEMPLARY EMBODIMENT(S)

Exemplary embodiments of the invention are discussed in detail below. While specific exemplary embodiments are discussed, it should be understood that this is done for illustration purposes only. A person skilled in the relevant art will recognize that other components and configuration can be used without departing from the spirit and scope of the invention.

A personalized portal site (e.g. My Yahoo!, start.com, or Google Personalized Homepage) may allow the user to select only content (e.g., interactive, read-only, updating, data feeds, etc.) to display on a personalized page, such as a new email alerts, current weather and/or traffic conditions, movie showtimes, horoscopes, etc. According to one embodiment of the present invention, these various modules that may be incorporated into a personalized portal page (one example of a container document) along with modules developed (e.g., by an a third party developer) for inclusion in the container.

Various embodiments provide a protocol for communication between a hosting site (e.g., container server system) and a module server (e.g., one operated by an entity other than the user or the hosting site), process instructions that describe the functionality of a module (wherever hosted), a structured repository system for module data and code that may include fixed module data and code as well as per-user configuration information or user preferences (e.g., in a weather mapping module, the postal codes in which the user is interested), and a proxy system that enables use of target site data in a site.

The system may comprise a number of components. The system may comprise a container server that serves a container document (e.g., a personalized page). The container document "contains" one or more modules, including one or more remote modules. As used herein, the term "container document" or "container" should be understood to include a personalized homepage of a website, a sidebar, toolbar element that incorporates one or more such modules, a page hosted by a site, a document capable of rendering modules (e.g., any document capable of rendering HTML code or XML code) in the format of the module (e.g., XML). Also, the container may be a website of another entity that incorporates the modules when supplied the modules through a syndication system.

As used herein, the term "module" may be understood to refer to a piece of software and/or hardware that renders data for use in a container document. Modules may be personalized to user preferences, preferences of the container, preferences of the environment or other inputs. A module specification may be understood to include a set of instructions used to render data for the container document using elements that have been predefined.

Overview and System Architecture

Figure 1:
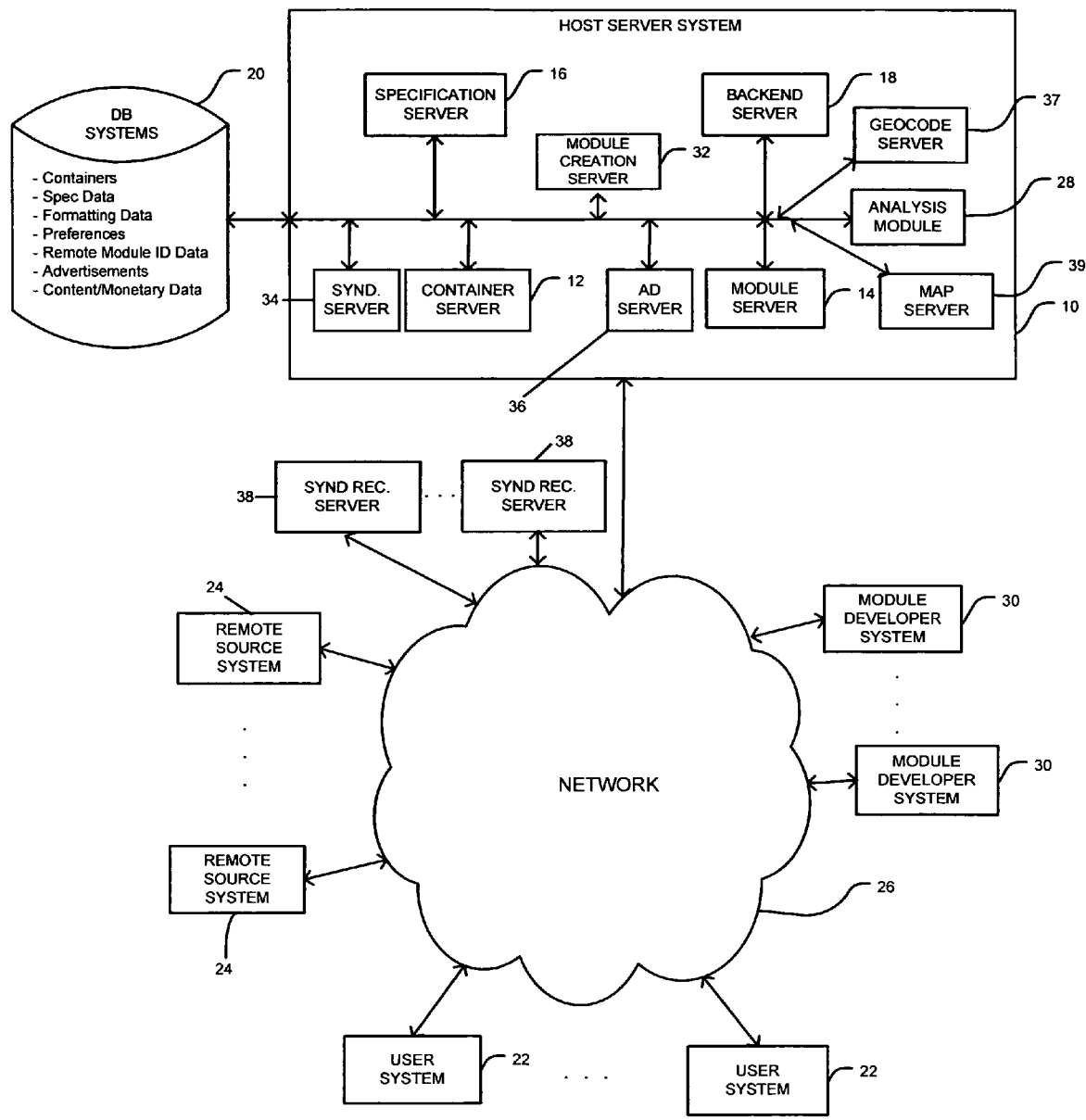
FIG. 1 depicts an overall system architecture according to various embodiments of the present invention.

FIG. 1 depicts an overall system diagram according to one embodiment of the present invention. As illustrated, FIG. 1 may comprise a host server system 10 with a plurality of modules that may be associated therewith. Such modules may comprise a container server 12, a module server 14, a specification server 16, a back end server 18, an analysis module 28, a module creation server 32, a syndication server 34, an advertisement server 36, a geocode server 37 and a map server 39. As illustrated, personalized container server 10 may connect over a network 26 to a plurality of systems.

Other systems connected to the network may comprise one or more user systems 22, one or more remote source systems 24, one or more module developer systems 30 and one or more syndication recipient servers 38. In addition, one or more database systems 20 may operate in conjunction with the various modules of host server system 10.

Container server 12 may serve the container document to user systems 22 over network 26. Container server 12 may comprise a web server or related server systems that takes data and/or instructions and formulates a container for transmission over the network to the user system 22. It should be appreciated, however, that container server 12 may reside on user system 22 as well so that a network connection may not be used. In the example in which the container document comprises a word processing document, for example, container server 12 may comprise a word processing module.

Module server 14 may provide data from modules to container server 12 for incorporation into a container document. It should be appreciated that in one embodiment, container server 12 and module server 14 may comprise a single unit performing both functions. Module server 14 may provide data for the container document by interpreting and/or parsing instructions in the module specification associated with the module. According to one embodiment, module server 14 may serve the module content to the container document through the use of a browser IFRAME. An IFRAME may be generally understood to be an independently operated browser window instance inside the container document. One advantage of an IFRAME is that is protects the container document from the IFRAME's content and vice versa, e.g., JavaScript on the container document may not be permitted to access any JavaScript code in the inner IFRAME (same for CSS, DOM, or cookie objects).

To expedite display of container documents, modules may be displayed inline within the container document. Inline display may be understood as referring to display with other document elements. One example is a display generated from code for HTML in the body according to HTML standards. In one embodiment, module server 14 or some other component may determine whether the module is deemed trusted prior to including it in the container document inline due to the risks of various security issues an inline module could create. According to one embodiment, the module may incorporate an indicia of approval (e.g., digital certificate) issued by the container module or an entity associated with the container module as described in detail below. If the indicial of approval is present, module server 14 may render the data from a module for inline presentation in the container document.

Specification server 16 provides the module specification file to module server 14. The module specification may be cached and stored in a database accessible to the module server 14 and/or specification server 16 or may be retrieved from a location associated with the specification as detailed later. For example, specification server 16 may reside on a remote source system 24. In addition, specification server 16 may be connected to module server over a network with the module specification located at another location on the network accessible to specification server 16.

Backend server 18 may be provided for interacting with one or more databases (e.g., large or dynamic databases of information). For example, for a news module that obtains frequent updates and demands a flow of data, (e.g, from an RSS feed), backend server 18 may format the data into HTML for the container.

In one specific example, a person may create a module (e.g., a maps module), such as one that uses an application program interface (API) to an existing mapping program to create a module to display a map of downtown Mountain View, Calif. The module may comprise an XML specification file or module specification file stored on a specification server. The specification server may comprise any server, including one on the site from which the container page is hosted or any other site. The user or another person may then include this new module on a personalized homepage (container document). The server that serves the container document may operate as the module server and the server that generates the mapping data through an inquiry from its API may be considered to be the backend server.

According to one embodiment of the present invention, analysis module 28 may analyze modules at various times (e.g., when the module is first selected by a user, each time the module is called by a container for inclusion or at any other time determined to be advantageous for safety and security and other times). Analysis module 28 may perform a number of actions, including comparing the module with a list of disapproved or dangerous modules or a list of approved modules. The comparison may involve exact or substring (e.g., prefixes, suffixes and regular expressions) matching by name or location (e.g., URL), contents of the specification, contents of the location where the specification resides, or information that may be ascertainable about the module. Analysis module 28 may take one or more actions in response to a determination that the module is disapproved or dangerous, including, for example, silently blocking the request, (i.e. providing a generic error), blocking the request with an error that explains the reason it was blocked or redirecting the request to a different module specification that has been determined to be safe and related to the disapproved module (e.g., another module that relates to maps, if the first one was a disapproved mapping site or a module that includes the keyword "basketball" if the disapproved module was a basketball module). For example, through redirection, the URL of the original module may be passed to the "safe" module. The safe module may then use a proxy server, as described below, to retrieve the original URL's content. Developers may then replace the error handler to fix small bugs in the original module to be able to display the content of the original module. In another embodiment, analysis module 28 may parse the module content to determine whether it is safe, such as by compiling JavaScript or other scripts contained in the module to try to identify unsafe or undesired actions the module may perform.

One or more module creation servers 32 may be provided. This server may operate as a "wizard" to enable module creators to create a module through an interactive process controlled by module creation server 32. For example, module creation server 32 may provide a series of user interfaces that enable the module creator to provide inputs that are then used by the module creator to automatically generate a module specification. For example, various module specification templates may be provided with corresponding inputs. Module creation server 32 may then take inputs supplied by a module creator, insert them into the template and then generate the module specification for the module. A preview, testing and debugging function may also be offered as part of this "wizard." This module may be downloadable as well so it may be installed and operated at any node on the network.

A syndication server 34 may prepare data for transmission to one or more syndication recipient servers 38 related to modules. Syndication server 34 may receive a request for a module and/or module content and deliver that module or content to a syndication recipient server 38 over network 26. Syndication server 34 may reside at host server system 10 or at another location on the network. For example, if an operator of a sports web site (an example of a syndication recipient system 38) desired to include a maps module created by a remote source system 24, it may do so through a request to syndication server 34. Syndication server 34 may then cooperate with module server 14 to generate data for the container document (here the sports web site page of the syndication recipient system 38). That may involve retrieving the module specification from remote source system 24, supplying preferences received from the syndication recipient server 38 (e.g., city information for the sports team of a page being displayed) and/or generating data for the container. It is also possible that the data may be rendered at syndication recipient server 38 into its container document in either an IFRAME or inline. Syndication server 34 may thus syndicate modules accessible to it. It may do so based on requests for specific modules or other criteria it determines (e.g., content matches, keyword matches, monetary values associated with modules and/or syndication requestors, etc.)

Ad server 36 may provide advertisements associated with modules to containers. For example, an advertisement may be incorporated with module data when data is delivered to a container document. Ad server 36 may operate with syndication server 34 to deliver advertisements to syndication recipient servers 38 based on a syndication request for a module. The advertisements may be selected by ad server 36 based on a wide variety of criteria, including, but not limited to, the relationship between the content of or information about the container, module, other modules in the container, syndication recipient server information, monetary elements/relationships related to any of the foregoing and/or combinations thereof. Ad server 36 may comprise the Google AdSense system, according to one embodiment of the present invention. Ad server 36 may operate as described in one or more of the following patent applications, the subject matter of which is hereby incorporated by reference in their entirety. Specifically, ad server 36 may manage online advertising by associating two or more concepts related to a module with an advertisement and associating a bid, collectively, with the two or more keywords in the manner discussed in the context of serving advertisements with electronic documents in U.S. patent application Ser. No. 10/340,193, filed on Jan. 10, 2003, entitled "Pricing Across Keywords Associated with One or More Advertisements," which is incorporated by reference herein in its entirety. Additional examples of presenting advertisements and managing advertising costs are discussed in U.S. patent application Ser. No. 10/340,543, filed on Jan. 10, 2003, entitled "Automated Price Maintenance for Use With a System in which Advertisements are Rendered with Relative Preferences" and U.S. patent application Ser. No. 10/340,542, filed Jan. 10, 2003, entitled "Automated Price Maintenance for Use With a System in Which Advertisements are Rendered with Relative Preference Based on Performance Information and Price Information," which are incorporated by reference herein in their entirety.

A geocode server 37 may be provided to generate geocode information from location descriptions as is known in the art. A geocode server 37 may generate latitude and longitude numeric values from geographic locations.

A map server 39 may generate map output. Mapping systems, such as Google Maps and Google Earth, may be used to generate this data.

One or more database systems 20 may be provided that store, in any number of ways, container information, module specifications and/or related information, formatting data, per-user and per-module preference data, remote module ID data, remote module location reference data, advertisement data, advertiser data, content/monetary data, syndication recipient data, templates for modules, inputs for modules, lists of trusted and untrusted modules, approval criteria and related information and/or any other information used by the modules to operate as described herein. While a single database structure is shown, it is well understood that the data may be stored at a number of locations and in one or more systems.

While one configuration is shown in FIG. 1, it should be appreciated by one of ordinary skill in the art that other configurations of these various modules may also be possible. For example, the various modules depicted within host server system 10 may be disposed at various locations around network 26 or at various points on several networks. In addition, whereas a single host server system 10 is depicted, it should be appreciated that any number of each of the modules depicted on FIG. 1 may be provided including network 26.

In one embodiment, network 26 may comprise the Internet. Other networks may also be utilized for connecting each of the various systems and/or servers.

In addition, what is shown as user system 22 may also operate as a remote source system 24 and/or a module developer system 30. In other words, one computer system may operate in different capacities: as a user system, as a remote source system, as a syndication server, as a target content server, and/or a module developer system. In addition, as explained in greater detail below, each of the modules depicted within host server system 10 may also be disposed at a user system 22, a remote source system 24, or a module developer system 30. Similarly, databases 20 may be associated with each of the modules depicted within FIG. 1 depending upon the configuration desired.

Illustrative Container Document Including Modules

According to one embodiment of the present invention, systems and method are provided to incorporate modules into a container document. One example of a container document would be a personalized home page, such as the Google Personalized Homepage currently available to users of the Google services on the Internet. Instead of restricting the types of content that a user is able to include in a container document such as a personalized home page, one or more embodiments of the present invention enable users to select modules from sources other than the source of the container document. So, for example, a user may elect to include a module in his or her personalized Google home page from a source not associated with Google.

Figure 2:
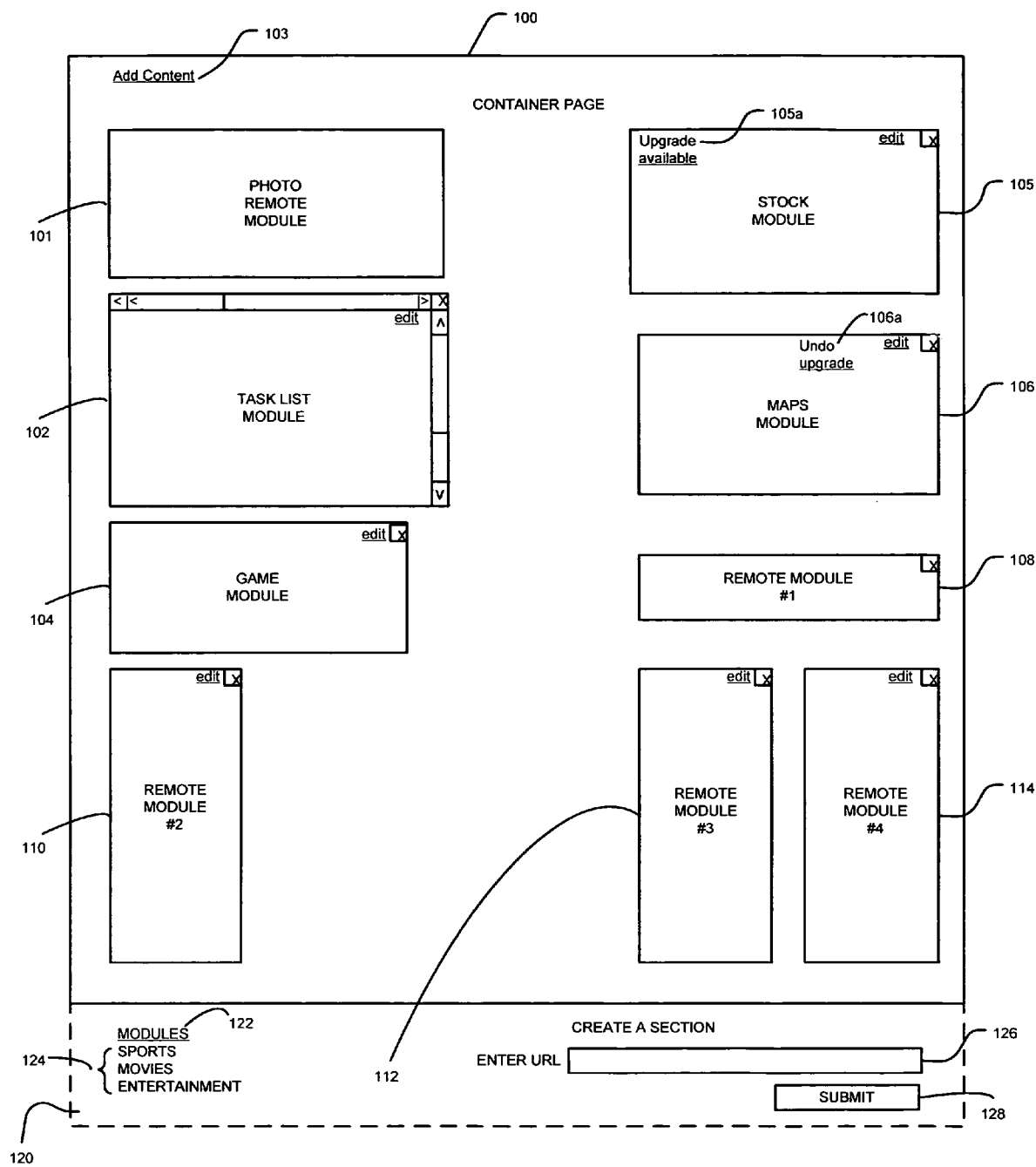
FIG. 2 depicts an illustrative container document according to an embodiment of the present invention.

It should be appreciated that various forms of the container document may exist but one such illustrative example is depicted in FIG. 2. FIG. 2 depicts a container page 100 with a plurality of modules that have been incorporated into the container document. A plurality of methods of incorporation are possible including the use of the IFRAME and inline HTML techniques. These issues will be discussed in greater detail below. FIG. 2 depicts a plurality of modules including a photo remote module 101, a task list module 102, a game module 104, a stock module 105, a maps module 106, a remote module 108, a remote module 210, a remote module 312, and a remote module 114. Different formats for the various modules may exist depending upon the specifications provided by the creator of the module. As depicted, some modules may provide scroll bars, and others may not. Some modules may be different sizes or shapes than other modules. In addition, some modules may offer the opportunity for the user to edit the display preferences and/or per-use data associated with the module. (See, for example, modules 102, 104, 105, 106 and 110 that provide an edit link.) For example, if the module relates to a maps module 106, the user may be provided the opportunity to edit an address or addresses that are mapped in that module. In one embodiment, inlined modules may be automatically sized by a container document so no scrolling, height or scaling information may be provided. If a module developer wants the module to have these properties in this embodiment, an inlined module may be wrapped with a fixed size <DIV> tag and content placed in the tag. The scroll bar, height and other characteristics may be then specified for the inlined content. One of the attributes allows specifying scaling=" . . . " to let the developer indicate how a module may be scaled up or down for different sizes of placements in the container documents.

One of the functions provided with this example container document 100 is the opportunity to add content to the container page through selecting the add content element 103. Upon selecting "add content" element 103, the system may offer the user the opportunity to interactively indicate an additional element to be included in the container page. Various forms of an interface to receive that input may be provided. One illustrative form is presented in FIG. 2 toward the bottom of the page in section 120. In that section, the user may be presented with an interface element to select from a browsable list of modules that may be arranged into a categorization structure. Another section of input section 120 may enable the user to specify a reference to a location for a module to be incorporated into the container document. Such a section may be such as that depicted through an input box 126 with a submit element 128. In one illustrative example, the user may specify a location reference (e.g., the uniform resource locator (URL)) where data exists related to a module to be incorporated. As explained in greater detail below, one example of the data is an XML-based file that meets the scripting preferences of the operator of the container document system 10.

Figure 3:
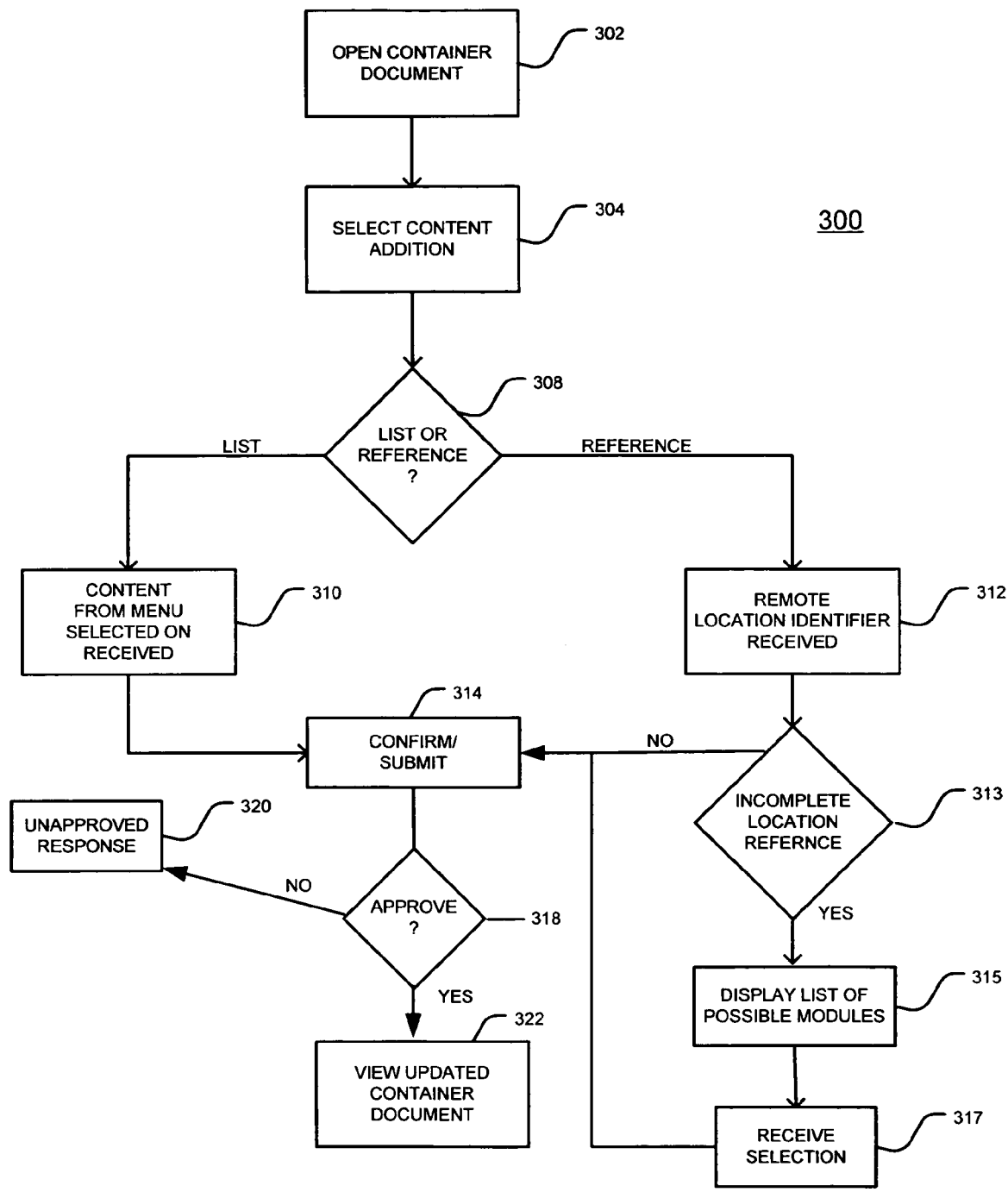
FIG. 3 depicts an illustrative process for adding a module into a container document according to an embodiment of the present invention.
Figure 4:
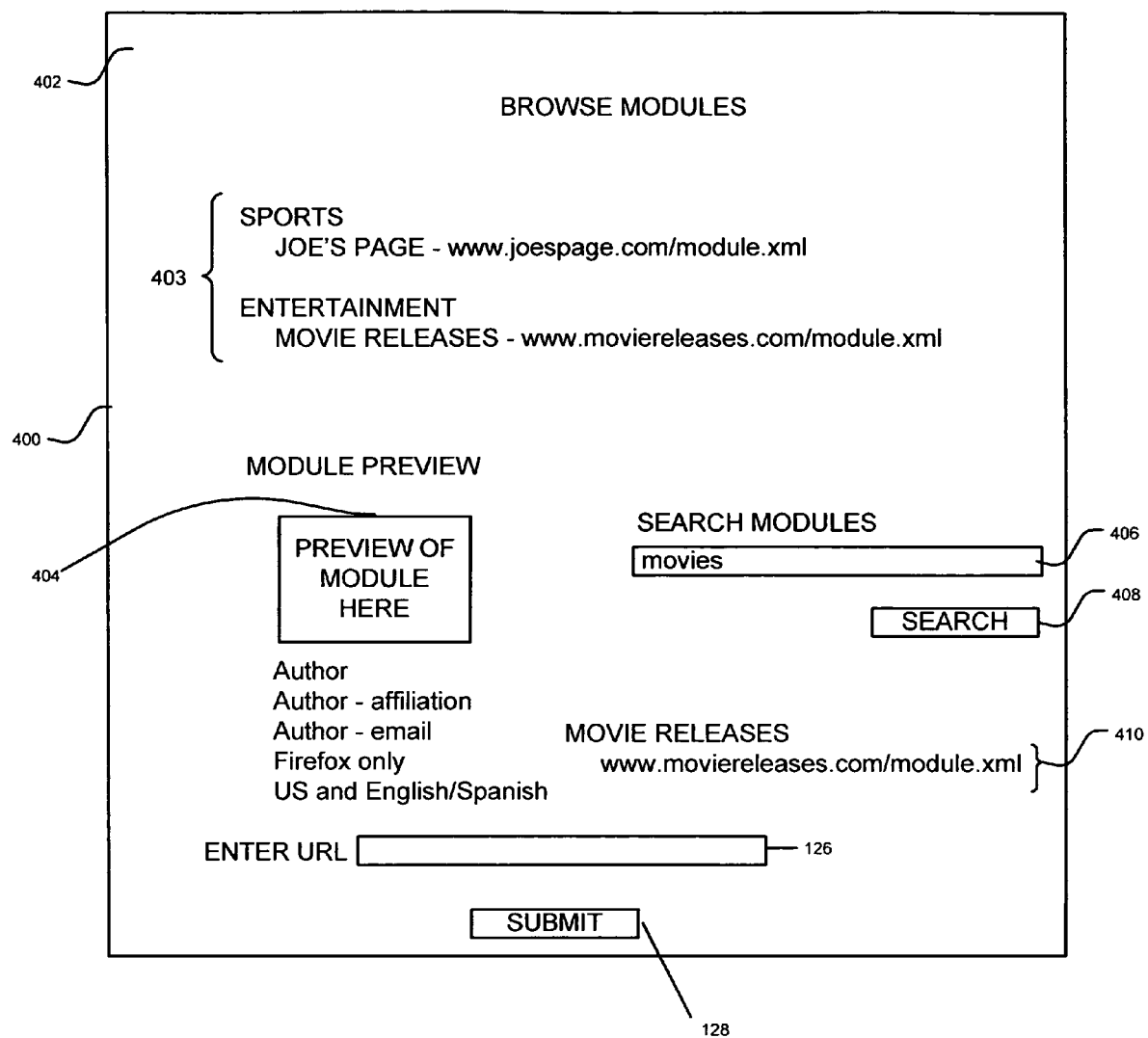
FIG. 4 depicts an illustrative interface for identifying a module according to an embodiment of the present invention.

Another option is depicted in FIG. 4 wherein the user may interact with an interface that allows the user to browse through modules by category in section 402 with a plurality of indicated available modules in section 403 or for the user to utilize a search functionality 404 where the user may put in information into a search box 406, select the search button 408 and have results displayed in section 410. The results of these searches and displays may provide the location reference (e.g., URL) of data (e.g., an XML file) for use in incorporating the module and the container document as described below with reference to FIG. 3 and other descriptions provided.

In FIG. 2 or 4, a preview of a module, author name, author affiliation and/or author email may be provided. To provide protection for email, an anonymized email forwarding feature may be used to help protect against spammer-crawlers. The display may also provide information about what a module requires or works best with using a May-Require attribute from a module preference (as described in detail below). Here the module works only with the Firefox browser and so that information is provided. Locality information may also be provided. Here, this module is designed for the Untied States and for English and Spanish.

In addition, in adding, editing or deleting modules, it may be desired to have those activities occur without a refresh of the container document. One illustrative technique for achieving this may involve use of AJAX so a module may be added to a container document without a refresh of the container document page (perhaps only a refresh of the IFRAME in which the new container is presented), or use of AJAX to remove a module without the container document being refreshed or when a developer is developing a module, being able to change modules without the container document in which they are populated having to have a page refresh in order to incorporate the changed module.

Figure 14:
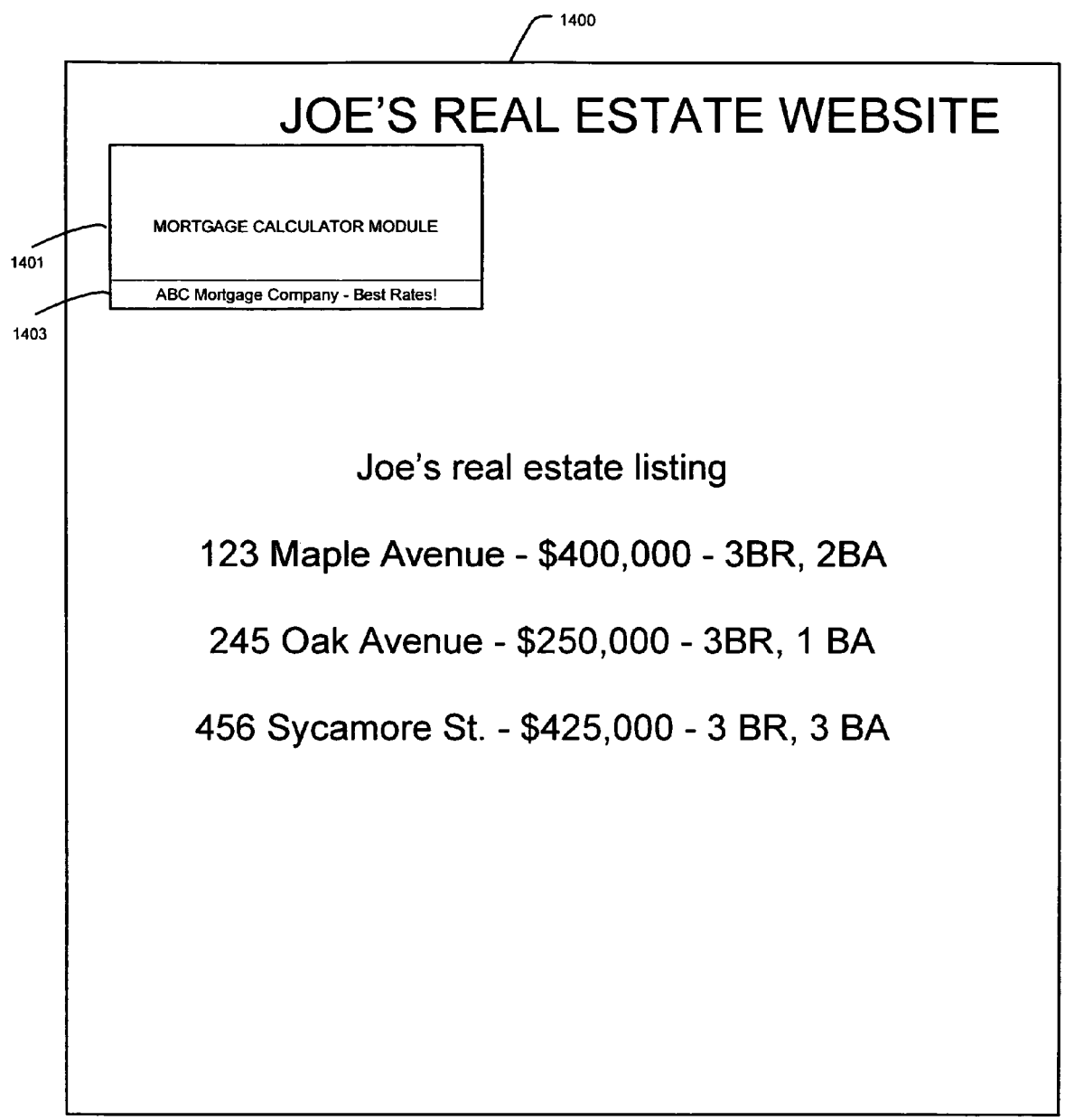
FIG. 14 depicts an illustrative embodiment of a third party web site incorporating a module through syndication with an advertisement included therewith according to an embodiment of the present invention.

FIG. 14 depicts another illustrative example of a container. This container may be operated from a container server that is not affiliated with the module server. The container 1400 may be a third party website (here Joe's Real Estate Web Page) that lists real estate listing information. A remote module 1401 may be incorporated through syndication from a module server. Here, the remote module may comprise a mortgage calculator that Joe's Real Estate Web Page may find useful for visitors to its site. With the module, one or more advertisements 1403 may also be provided, as illustrated.

Illustrative Methods

FIG. 3 depicts an example of a method 300 used to add a module to a container document. According to one embodiment, in block 302, a container document may be opened into which a new module is to be added. This may be performed by presenting the container document to a user or by a computer software element opening the container document to determine its contents, for example. In block 304, a selection of content to be added is received. This content selection may be received from a user such as through the inputs described with reference to FIG. 2 or FIG. 4 or through some other mechanism by which the user may provide an indication of a module to be added to the container. In addition, in block 304 modules may be provided through an automated process whereby the system determines a module to be added based upon various inputs.

In the case of a user input of, for example, a request to add content through module 103 of container page 100, in block 308 it may be determined whether the user is requesting the addition of a module through a list of available modules or through a reference. If the user is providing an input from a list, the content from a menu selection may be received in block 310. That may be achieved by interaction of the user with an interface such as that depicted in FIG. 2 or FIG. 4 by selecting one or more modules presented such as that in 124 or 403 for example. Other methods of receiving a selection of a module may also be provided. If the user is providing a selection of a module from a reference, then in block 312, a location reference may be received. To facilitate the user's ability to identify the data for the module, an optional block 313 and 315 may also be provided. In block 313, if the user's remote location identifier ends with a slash, for example, or other indicator that the user is asking for files at the location to be retrieved, then in block 315, a list of possible modules may be displayed. Block 315 may involve taking the remote location identifier provided by the user and quering that location for a listing of files or data representing module specifications, and presenting the received response to that query in a list for the user to choose. For example, the user may be provided a list of files of module specifications at the location provided whereby the user may select in block 317 one of those presented files. For example, if the user provides a URL that ends in a slash or provides some other incomplete location reference, the system may in block 315 retrieve a listing of all files containing module specifications at the location of the URL whereby the user may choose one of the files, such as one of the XML files in block 317. In another example, the system may automatically guess from the content or provide a directory listing or object listing (e.g., through a database query) using web server resources, such as an Apache webserver directory call or IIS directory call. The list may be formatted in a way to make it easy to select such as by highlighting more likely choices.

In block 314, the system may optionally enable the user to confirm the selection of the module to be added before the container page is updated. Upon performance of block 314 or if a confirmation action is not included in the process, after blocks 310 and/or 312 and/or 317, an optional approval block 318 may occur.

According to various embodiments of the present invention, the operator of the container document may desire to protect the security of the container as well as the security of the user systems interacting with the container. Accordingly, one or more actions may be taken to determine whether the module is approved prior to enabling the content to be incorporated in the container. For example, an evaluation of the content may occur to determine whether a module is trustworthy, for example if there are not HTML tags or other characteristics determined to be trusted. These actions are described in greater detail below. If the approval is not met, then in block 320, one or more unapproved responses may occur as described above with reference to analysis module 28.

If approval occurs, in block 322, the updated container document may be presented to the user or to whomever has provided the input of the module to add to the container.

As described in greater detail below, according to the present invention, a specification may be provided for modules to utilize in order to be incorporated into a container document by the host server system 10. FIG. 5 depicts a module specification according to one embodiment of the present invention. At its base level, the specification may comprise a plurality of elements including the XML version information, module preferences, which may be optional, user preferences, which may be optional, a content type designator and then a content element that is used to populate the portion of the container allocated for the module. It should be appreciated that the content may be specified in various forms of code, typically code that is interpretable by a user system when generating the container for presentation. Such code may include HTML, JavaScript, or other forms of code that may be used to depict the format of a web page.

According to another embodiment of the present invention, the module specification may be embedded in one or more other files or computer instructions. According to this embodiment, the module server 14 may, when provided with the identification of data for generating a module, look for a module specification within the data. One of the forms of data may be another HTML file, as depicted in an illustrative example of FIG. 6. In this example, amongst other codes of an HTML document, a document specification may be provided as shown for example in FIG. 6. This example is a simple form of a module that would depict the words, "Hello world!", within the portion of the container to which it has been allocated. As is shown, the document specification is contained within another HTML page and accordingly the file in which the document specification is located likely would have the suffix of .htm or .html. In another example, a computer instruction, such as "debut," "about" or some other instruction may be identified that provides the specification. Thus, according to one embodiment of the present invention, although the document specification may comprise an XML type file, the source of the module specification may actually be another form of data or file type from which the module specification may be identified.

In addition, a repository of data may alter, modify, change, or corrupt a module specification. For example, many data repositories "escape" HTML or XML content when it is stored and used as a source. Some system may then unescape the source code for presentation. Accordingly, if a module specification is included in data that has been escaped, a module server or specification server may detect that the code has been escaped, determine the manner of unescaping to be used (e.g., based on the source, based on the type of codes used or other techniques) and then unescape the data to return it to its original form. FIG. 6(b) illustrates an example of the file of FIG. 6 after it has been escaped. In this example, the symbol "<" has been changed to "<" and the symbol ">" has been changed to ">" and several other changes have been made.

Similarly, with other alterations or modifications to the module specification, the module server or specification server may detect the alteration or modification, determine how to reverse the alteration or modification or otherwise output the module specification to its intended form.

Illustrative Method of Module Handling

Figure 7:
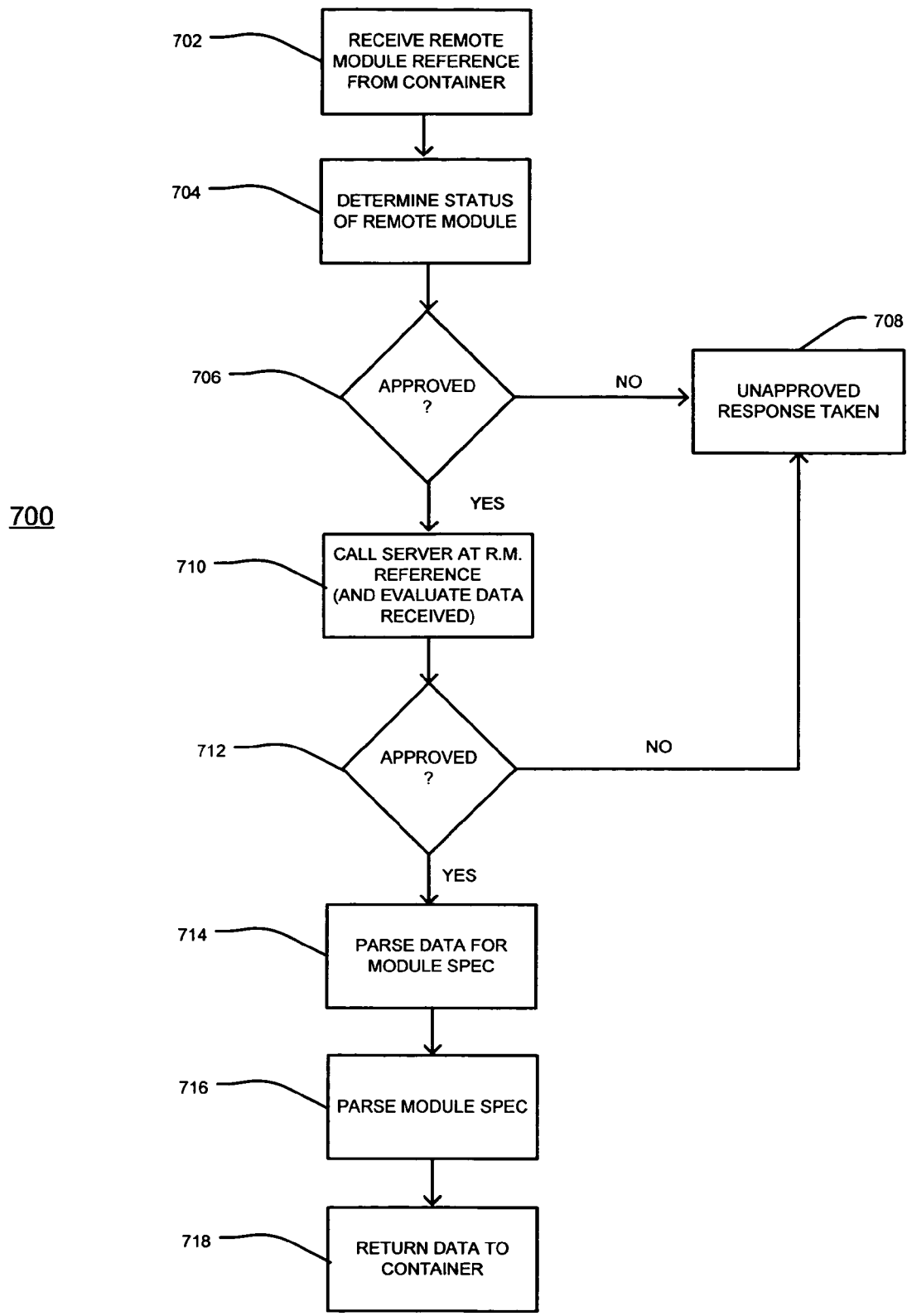
FIG. 7 depicts an illustrative process for incorporating data from a module into a container document according to an embodiment of the present invention.

Once a module has been incorporated into a container, when the container is opened or refreshed, a method may be performed to generate the data from the module for inclusion in the container. One illustrative method of doing so may be depicted in FIG. 7 in process 700.

In block 702, a module reference may be received from the container. For example, the container for a user may specify a plurality of different modules that are to be incorporated. It may indicate those modules by a reference to the location of the module. If the module is specified as type URL, then the module is located at a place potentially remote from the server of the container. According to one embodiment of the present invention, block 704 and 706 may be provided. In block 704, the status of the remote module may be determined, for example, by an analysis module 28. If the remote module is approved in block 706, then processing may proceed to block 710. If it is not approved, then one or more unapproved responses may be taken in block 708. In block 710, the server associated with the remote module reference may be called and the data received may be evaluated. According to another embodiment of the present invention, block 710 may involve retrieving the remote module from a cache associated with the container server. In optional block 712, one or more of the activities associated with block 704 may be performed to determine whether the remote module is approved. This may be desired because as remote modules are under the control of another party, they are subject to possible change on a frequent basis. Accordingly, in between the time that a module is included into a container the first time and the time which it is displayed a second time changes may have been made to the remote module that would render it unapproved.

In block 714, the data that has been retrieved from the remote module reference is parsed to identify a module specification. As discussed above, the data may comprise a file that merely includes the module specification and therefore step 714 is used to extract the module specification from the data provided. In block 716, the module specification is parsed to determine how to generate data and in block 718, data is returned to the container whereby the container when accessed by a user system or other system opening the container may be able to view the contents of the remote module. The various activities associated with parsing the module specification 716 are provided in greater detail herein.

Figure 8:
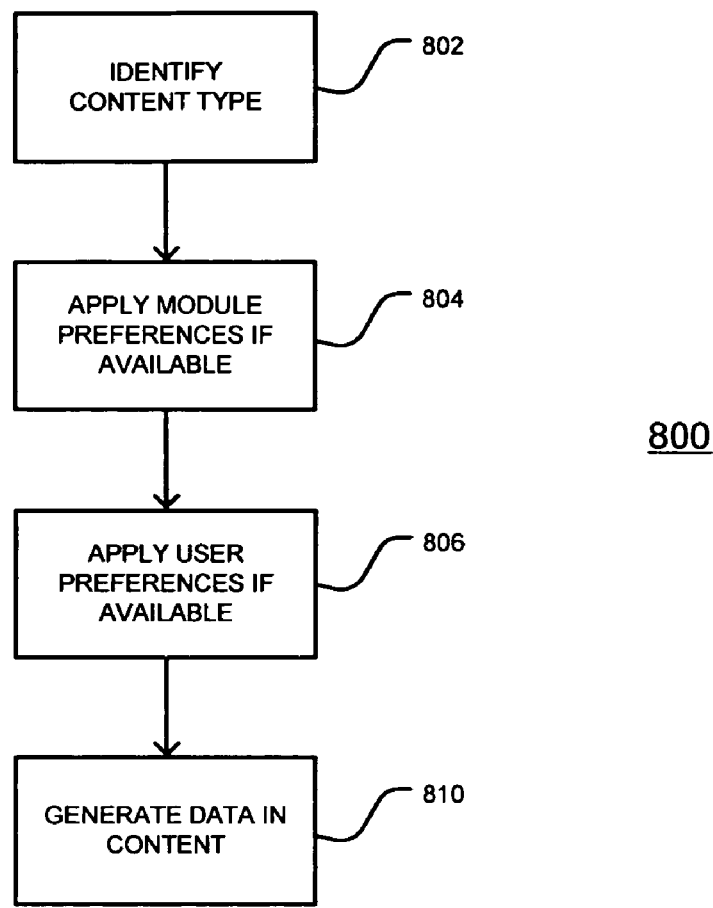
FIG. 8 depicts an illustrative process for generating data from a module according to an embodiment of the present invention.

FIG. 8 depicts more details regarding the activities involved in block 716. Particularly in block 802, the parsing operation may identify the content type specified in the module specification and take action appropriate based upon the content type. For example, for an HTML content type, the module data is resident on the server. In block 802, module preferences may be applied if available. Greater detail regarding module preferences and how they may be applied are provided below. In block 807, user preferences may be applied if available. Greater detail about user preferences are provided in greater detail below. In block 810, based upon module preferences if available, user preferences if available and the content and content type of the module specification, data may be generated for delivery to the container.

According to one embodiment, the modules may be created according to a specification. The module specification may specify elements that are required and those that are optional. In one embodiment, content type and content may be required and user preferences and module preferences optional. Other embodiments may have no required elements.

According to one embodiment of the present invention, a module may be specified by an XML file, placed somewhere on the Internet where it can be found by a module server. The XML file that specifies a module may contain instructions on how to process and render the module that in turn may then be interpreted by the module server to render the data. The XML file may contain all of the data and code for the module or it can have references (e.g., URLs) for where to find the rest of the elements.

There may be a plurality of different types of remote modules: HTML, URL, and XSLT, for example, or a smaller list of predefined types as well, such as HTML and URL.

For <Content type="html">—the body of the <Content> is html and may be hosted by the host server system 10. This may be useful for modules that incorporate JavaScript. In one embodiment, as described herein, the container may embed untrusted HTML within an IFRAME for safety. Implementations may also parse the HTML content and determine that it is safe to display without a surrounding IFRAME.

For <Content type="url" href= . . . >—the body of the <Content> may be ignored, and the IFRAME src=points to the url specified in the href attribute. This may be a useful content type for server-side dynamic content generation. In one embodiment, a url type may be served in an IFRAME. This enables the container system to obtain cookies from the site serving the data at the URL, parse user preferences correctly and other advantages.

For <Content type="xslt" frame=yes|no href= . . . >—body of the <Content> may be an XSLT stylesheet which is applied to the content located at the URL specified in the href=attribute. Again, the default for this type of module may be IFRAME presentation as one way to protect against malicious HTML/JavaScript.

One example HTML module is shown below:

| Line | Explanation |
|---|---|
| <?xml version="1.0" encoding="UTF-8"?> | standard way to start XML files |
| <Module> | indicates that this XML file contains a module for use with a container document |
| <Content type="html"><![CDATA[ | indicates that the body of the <Content section contains HTML |
| Hello, world! | the actual HTML |
| ]]></Content> | end of the Content section |

According to one embodiment, a module may have a content section as shown below.

```
<Content type="html">
<![CDATA[
    . . . place where module create places HTML (or other browser recognizable code)
]]>
</Content>
```

Module preferences may be optional per-module configuration information, such as preferred sizing, title, author, and so. For example,

```
<Module>
    <ModulePrefs title="Today's place on the Internet Traffic"
title_url="http://www.placeoninternet.com/stats/" height="200" author=
"Robert Smith" author_email="rsmith@placeoninternet.com" />
    <Content...>
    ...content...
    </Content>
</Module>
```

An example table of module preference attribute <ModulePrefs...> names may include:

| Name | Description |
| --- | --- |
| title | Optional string that provides the title of the module. This title is displayed in the module title bar on the user's personalized home page. |
| title_url | Optional string that indicates where the module resides. |
| description | Optional string that describes the module. |
| author | Optional string that lists the author of the module. |
| author_email | Optional string that provides the module author's email address. |
| author_affiliation | Optional string that specifies one or more affiliations for the author (e.g., Google or Joe's Module Developer, Inc.). |
| height | Optional positive integer that specifies the height of the area in which the module runs. |
| scaling | Optional boolean that specifies whether the aspect ratio (height-to-width ratio) of the module is maintained when the browser is resized. Modules that can automatically scale vertically may elect to set this to true, but modules which have a fixed height should set this to false. The default may be true. |
| scrolling | Optional boolean that provides a vertical and/or horizontal scrollbars if the content exceeds the space provided. If false, then the content is clipped to the height and width provided. The default may be false. |
| render_inline | Optional string that indicates whether module may be displayed inline |

Also within the <ModulePrefs> preference attribute, a <MayRequire...> element may specify information for compatibility and may be displayed in the directory. This information may also be used for attribute searches of modules. It may be used to provide information or validated by software within the analysis module for accuracy. In one embodiment, this attribute may be used in presenting modules in search results or browsing to enable users to understand what the module may need to operate in the way the module creator intended.

For example, one module that requires QuickTime, a WINDOWS platform and a Firefox browser may provide the following module preference attribute values.

```
<ModulePrefs...>
    <MayRequire type="plugin" value="quicktime" />
    <MayRequire type="browser" value="firefox" min_version="1.06" />
    <MayRequire type="platform" value="windows" />
       this is a detailed explanation of windows
    </MayRequire>
</ModulePrefs>
```

Predefined values for type and value attributes may be specified, which may be updated over time to include additional possible values. A type=other may be provided as a catch-all.

If multiple MayRequire elements are provided, a logical OR may be used to interpret multiple attributes of the same type and a logical AND may be used to interpret multiple attributes of a different type. For example, multiple browsers may be specified and the interpreter understands that any of the specified browsers may be used. If a browser attribute and a plugin attribute are provided, the interpreter understands that both may be expected (the logical AND). It is also possible to use an attribute that specifies what a module will not operate with.

Also within the <ModulePrefs> attribute, a <Locale...> element may allow a developer to specify a country and/or language for which the module is designed. It may be specified as <Locale lang="..." country="...">. Semantically, this may be interpreted to indicate that the module is acceptable for users who have specified that they prefer this language and/or are located in the specified country. This may assist a container server in complying with legal restrictions. For example, if a country precludes certain types of information from being offered for sale, a sale module may detect the locale preference to present those items for sale only in countries where it is legal. It may also be used for directories and searches to hide or rank modules based on user detected or specified locale. In addition, it may be possible to provide an optional attribute for a code, which may allow specification of a standardized code, such as an ISO 3166 code. In this variation, specification of such a specific code may override language and country attributes if present.

Providing values for "lang" and "country" values may be optional. If one is missing, it may be interpreted as an ALL value (i.e., all languages for a specified country or all countries for a specified language).

In one embodiment, if no locale data is specified, then the interpreter may assume one country and language (e.g., US and English) or a predefined set of countries and languages. Shorthand values may be used as well, such as known two-digit values for countries (e.g., NZ for New Zealand, MX for Mexico, etc.). The list of countries may also be determined, such as by scanning content for certain words, strings, characters, etc. that are characteristic of certain locales, looking at the author information or other possible choices. Shorthand values may be used as well, such as known ISO two-character representations of countries (e.g., NZ for New Zealand, MX for Mexico, etc.).

The reader_inline attribute may be an optional preference. In one embodiment, predetermined values may be provided including "required" which means the module must be inlined to work properly; "never" which means the module will not work properly if inlined, and "optional" which means it will work either way.

In other embodiments, it may be desirable to cache module specifications that would ordinarily be available from a specification server remotely located over a network from the module server. For example, if a specification server is operating on a slower connection its transmission of the module specification may cause the generation of data for the container document to be slow or unavailable.

Thus, a caching element in the module preferences may set one or more attributes that indicates the caching rule to be applied. For example, for modules of url type, a cache rule preference may specify attributes including a size element (e.g., cache the module content only when the screen size is identical, otherwise reload). This may be a default caching behavior for modules that do not want the user identification to be specified. Another attribute may be based on a "user" value (e.g., cache the content per-user only, for any rendering dimensions). Another attirbute may be based on a "user,size" value combination (e.g., cache the content for a given user and given screen dimensions only). This may be the default caching behavior for modules of a url type and that accept a user identification. Also, an age attribute may be specified such that modules may be cached for a certain period of time. The value of this attribute may be the maximum number of seconds to cache the content. This number may be suffixed with "s" for seconds, "m" for minutes, "h" for hours or "d" for days. For example, <ModulePrefs CacheMaxAge=45d> would allow caching for 45 days. For example <ModulePrefs CacheMaxAge=0> effectively disables caching. The default value may be infinity, which can be explicitly specified with "CacheMaxAge=infinite."

Modules may comprise "small" versions of applications suitable for containers such as personalized home page(s), HTML emails, portable digital devices (PDA's), telephones, cell-phones, interactive media devices, video game consoles, television overlays, etc. or any other device configured to display content based on a format (e.g., HTML). With a small screen size, the application may be adapted to be more concise and less cluttered with promotions and ads, etc. Sizing may be achieved through module preferences, with different output devices having different preferences, for example or the module specifying how to behave on different output devices that render the data for display.

full, minimized-titlebar-only, minimized-visible (e.g., visible icon on bottom or in a toolbar), minimized-invisible (e.g. only available from a menu) or closed. In all visibility states, the module may be still "on" the user's page in the sense of able to response to events (including timed events) and able to interact with the system (e.g. including changing its state). Also, the system, end user or module may control the visibility of the module, either the "default" visibility, or the visibility under a variety of circumstances, e.g. define states such as "active." Illustrative examples include a weather module that remains minimized (for some definition) until there is unusual or extreme weather. A traffic module could remain minimized until a relevant traffic alert occurs. A stock module may display only stocks with changes greater than a predetermined percentage. A fantasy football module may be only active on weekends or within a predetermined period of time of the first game. The user may have the option to manually override these preferences from a menu, for example. Also, as another example, an email module may size itself to reflect emails deemed important by some criteria.

Many modules may elect to access large databases and dynamic services hosted elsewhere on the Internet. For security purposes, browsers typically require that any JavaScript "come from" (<script src= . . . >) the same host as the content it retrieves. Therefore, a module using such a technique may co-locate the JavaScript source files and the services the JavaScript code accesses. For example, here is a working Google Maps module, which uses the Maps API:

```
<Module>
<ModulePrefs title="Map of___UP_loc___" height="300"author="John Doe"
author_email="jdoe@emailaddresse.com" />
<UserPref name="loc" display_name="Location" datatype="location" required="true" />
- <Content type="html">
    - <![CDATA[
        <script src="http://maps.google.com/maps?file=js"
        type="text/javascript"></script>
        <div id="map" style="width: 100%; height: 100%;"></div>
        <script type="text/javascript">
        var prefs = new _IG_Prefs(___MODULE_ID___);
        var map = new GMap(document.getElementById("map"));
        map.addControl(new GSmallMapControl( ));
        map.addControl(new GMapTypeControl( ));
        //alert(prefs.getString("loc.lat") + " " + prefs.getString("loc.long"));
        map.centerAndZoom(new GPoint(prefs.getString("loc.long"),
        prefs.getString("loc.lat")), 6);
        </script>
    ]]>
</Content>
</Module>
```

For example, to fit a module to the size of the window it is given, the module may specify a height (in pixels) using <ModulePrefs . . . height="200">. Also, if a module does not fit in the size provided, scrollbars may be automatically added if <ModulePrefs . . . scrolling="true">.

Module preferences may thus be used to enable module creators to specify screen dimensions, visibility state—e.g., In connection with this example, a userpref datatype=location should geocode (i.e., turn a string into latitude and longitude).

Many modules may accept user preference information—for example, a weather module may expect to receive the postal code(s) the user wants to watch. An example module with user preferences expected is shown below.

```
<?xml version="1.0" encoding="UTF-8" ?>
<Module>
    <ModulePrefs title="Weather Map" title_url= "http://www.internetplace.com/weather-
    map.html" height="260" />
```

-continued

```
  <UserPref name="loc" display_name="Location" datatype="location" />
  <Content type="url" href="http://www.internetplace.com/weather-map.html />
</Module>
```

If either the user changes the module URL, or the module specification changes, any previous user values may get out-of-sync with the new module spec. To resolve this, the server may choose to pass preference values anyway. Old user preferences may be deleted, ignored or also passed along where the specification server may ignore them.

An example table of user preference attribute names includes the following:

| Name | Description |
| --- | --- |
| name | "Symbolic" name of the field; displayed to the end user during editing if no display_name is defined. In one embodiment, the name field may use only letters, number and underscores, i.e. the regular expression ^[a–zA–Z0–9_]+$. In other embodiments, other designators may also be used. |
| display_name | Optional string to display alongside the user prefs in the edit window |
| urlparam | Optional string name to pass as the param name for content type=url |
| datatype | Optional string type name (defaults to "string") that indicates the data type of this field. The options may include "string," "bool" and "enum" |
| required | Optional boolean argument ("true" or "false") indicating whether this user pref is required. |
| default_value | Optional string value to provide as this user pref's default value. |
| num_minval | Optional numeric value that indicates the minimum allowed value for this user pref. |
| num_maxval | Optional numeric value that indicates the maximum allowed value for this user pref. |
| cdata | Repeated string value, in which each string is HTML. It may represent the optional data between preference tags. |
| str_maxlen | Optional numeric value that specifies a maximum string length for this user pref. |

Among these preferences, some modules may have logins and other authentications to obtain the data. This information may be passed to the specification server through the preferences. Other techniques may also be used to facilitate these systems, including creating special user preferences for certain module creators, anonymous user identifications passed to the specification server, placing cookies in an IFRAME for the specification server, per-user login screens and other such techniques.

A JavaScript preferences interface may be included with a JavaScript-based module to obtain user preference passed in. This interface may comprise a plurality of JavaScript functions including the following:

| Name | Description |
| --- | --- |
| _Container_Prefs(moduleId) | The preference constructor. It takes a module ID as an argument. E.g.: var prefs = new _Container_Prefs(MODULE_ID); |
| getString(name) | Retrieve the user preference identified by name as a String value. |
| getInt(name) | Retrieve the user preference identified by name as an Integer value. |
| getBool(name) | Retrieve the user preference identified by name as a Boolean value. |
| getModuleHeight( ) | Retrieve the current module height in pixels. |
| getModuleWidth( ) | Retrieve the current module width in pixels. |
| getUserId( ) | Retrieves a unique userId for the user. |
| dump( ) | For debugging, uses document.writeln( ) to display all of the available preferences. |

In addition, information related to preference protocols may be used as well. For example, container preferences, module preferences, user preferences, syndication recipient system preferences and users of the syndication recipient system may specify preferences that might apply to a module. A protocol may be established that determines which preferences take precedence over others if a conflict exists. For example, if a container limits a module to 100×120 pixels and a module preference indicates that the module should be larger than that, the container preference may override the module preference. Or, if different time zones apply to the container, the user system and the syndication server, the time zone of the syndication server might override a user preference. Other protocols are also possible.

The content section in the remote module XML file contains information about the module's content type. For example:

```
<Module>
  <ModulePrefs . . . />
  <Content type="url" href="http://www.placeontheinternet.com/cgi-bin/asah/modules/igstats.cgi" />
</Module>
JavaScript example:
<Module>
  <ModulePrefs . . . />
  <Content type="html">
    <![CDATA[ <script language="JavaScript" src="http://www.placeontheinternet.com/igoogle/modules/clock/clock.js"></script>
    ]]>
```

-continued

```
    </Content>
</Module>
```

The content section can also contain pure HTML. An example table of module preference attribute names is shown below:

| Name | Description |
|---|---|
| type | Optional string that gives the type of the content. The possible values may be "html," "javascript," "xslt," and "url" for example. The default is "html." |
| href | Optional string that provides a destination URL. The default value is "". |
| cdata | Optional string that indicates that the data generation portion of the specification follows. |

Many modules may be CGI-based front-ends to other services. To set up a CGI script, the user may create a directory, copy an example CGI script into it, and test the CGI script.

Scalable Vector Graphics objects (e.g., Macromedia FLASH, MPEG4, etc.), video players, audio players, and the like may be part of a module by wrapping the code for the object with HTML that refers to and invokes it. The module server may check for this information and determine a module to be untrusted based on inclusion of a flash object and thus serve it in an IFRAME. It is also possible that such modules may be deemed safe and rendered inline.

Module creators may update modules. Accordingly, the module creator may have several options for users to learn about and/or begin using the newer version of a module. For example, the module creator may provide a new version of a module in the same location, thus forcing users to upgrade to the new version when the container includes a reference to that location. When a call is made to retrieve a module specification at that location reference, the specification of the new version may be retrieved. If a module creator and/or user does not want to have new versions mandatory for the users, then a new version may be made available at a different location reference in the Module Prefs. Users may then be notified through various mechanisms that a new version is available and provide them with the new location reference (e.g., URL) to use in identifying the newer version of the module in a container document. For example, the module creator may publish to a new version to a new reference locator (e.g., URL), then modify the old location reference (e.g., URL) to provide notice to users of the upgrade.

In addition, in various embodiments, the module specification may include a field or a preference that enables a module creator to indicate that a new version of the module has been created. The module server may then identify an indication that a new version is available during the parsing process and modify the module data output (e.g., annotating the module titlebar with an indication such as "upgrade available," with a link to a confirmation window, which upon confirmation updates the user's module location reference in the container document to the newer version). For illustrative purposes, module 105 in FIG. 2 includes a selection "upgrade available" 105*a*. Other methods of modifying the module data output to notify and/or accept input related to a user selection to upgrade to the newer version may also be possible based upon the inclusion of information in the module specification. In addition, it may be possible to provide a selection to enable the user to return to a previous version. For example, some users may not like an upgrade or the upgrade may have performance issues (e.g., bugs, etc.). Thus, the module server may automatically (or based on an input in a module specification) present an option to a user to return to a previous version. For illustrative purposes, module 106 has been provided with an "undo upgrade" selection 106*a*. This may be done for a predetermined period of time, until another upgrade is available or indefinitely. Indeed, repetitive selection of "undo upgrade" may return the selection to several versions earlier of a module.

Information related to location references of earlier versions may then be stored and accessible to the module server and/or be stored in the module specification to enable those location references to be used.

In various embodiments, specification server 16 may thus run a local web server (e.g., Apache server) or use a managed hosting facility which typically provides faster connection responses. By default, module content may be presented in an IFRAME hosted on a domain separate from the domain of the container server. For example, the IFRAME may be hosted by the same or different container server but served from a different host name (or IP address) in the URL. This may help protect users from malicious modules that might (for example) attempt to "steal" any cookies associated with the domain of the container server.

A host server system may not want to include untrusted HTML inline without precautions. A malicious module if rendered inline may read or modify cookies, including authentication credentials, set by the host server system. The malicious module may also read or modify the container (e.g., personalized homepage associated with the host server system). It may also utilize phishing (e.g., imitating a login box) or code that replaces the entire page (via document.location) with a phishing site that looks like the personalized homepage. It may also utilize undesired pop-ups, dialog boxes or infinite looping codes. A malicious module could also pass information to IFRAMEs, which may then generate any of the foregoing problems in the IFRAME.

Thus, according to various embodiments, the content may be placed in IFRAMEs. As an additional level of security, the content in the IFRAME may be served on numeric IP addresses.

Another level of protection may involve HTML type modules utilizing a library of scripts that hide user preferences from being generated in the output HTML in the container.

In addition to use of IFRAMEs to render data of modules, other security features may be utilized. For example, users of the container page may be requested to acknowledge risks when adding untrusted modules to the container page. Also, untrusted models may be indicated in some manner (e.g., visual demarcation, such as a colored border). In addition, various functions may be disabled in the IFRAME, such as the JavaScript alert( ), confirm( ), and prompt( ) functions, which may be accomplished, in one embodiment by inserting dummy function definitions (e.g. function alert( ) {;}) before the actual content. Because an additional IFRAME in the content could be used to circumvent this disabling, the container may refuse to include a module that includes an IFRAME or uses the JavaScript eval( ) function.

Illustrative Inline Generation Process

According to various embodiments of the present invention, it may be desired to present the content of a module inline of the container. There are risks associated with inlining content into the container as discussed herein. Accordingly, it may be desired to enable a module to become inlined a container upon becoming "trusted" by the system.

A module may be deemed trusted according to various techniques including if the module uses HTML and other codes that have been statically proven to be safe through various known techniques.

Figure 9:
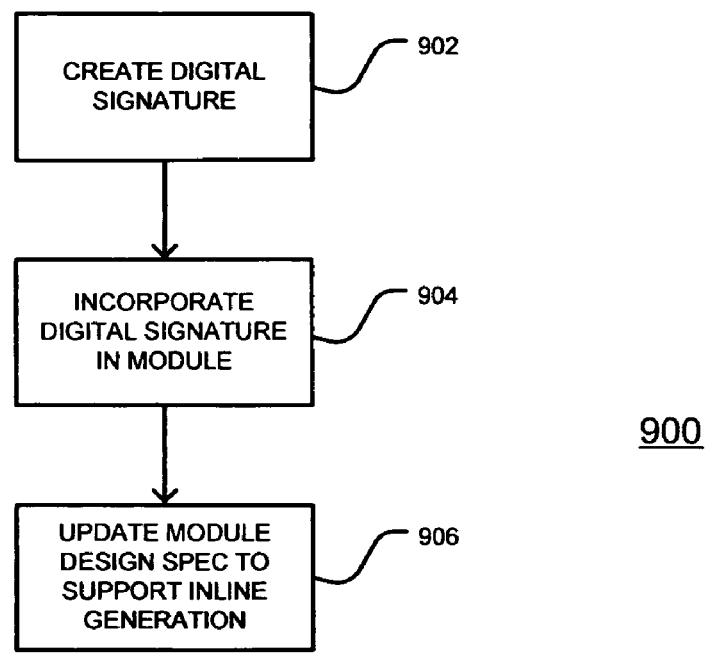
FIG. 9 depicts an illustrative process for enabling a module to be inlined in a container document according to an embodiment of the present invention.

Another method of achieving sufficient level of trust for the system might involve a methodology based upon digital signatures. One illustrative example methodology may be depicted in FIG. 9. This process 900 may involve a number of one or more blocks. In block 902, a digital signature may be created. Various functions and techniques for creating digital signals are known and may be used herein. One such system takes various data as an input and randomly generates based upon those input a series of numbers that are unique for the particular purpose (i.e., no two people have the same digital signature).

The digital signature may be provided by the container server and/or host server system based on a validation of the module. In one embodiment, content of a module may be validated only if it does not include any external content such as IFRAMEs or javascript "src=" statements. In validating or certifying a module, it may be manually inspected by a person associated with the container server and/or host server system or a person approved by those operators.

In block 904, the creator of a module may incorporate that digital signal into the module. In block 906, the creator of the module may update that module design specification with code that indicates that the module supports inline generation. When this occurs, the module when rendered by the container server is presented inline with the container.

To avoid conflicts with other instances of the module on the user's screen, _MODULE_ID_ may be added to all HTML names/IDs and to all JavaScript functions and global variables. For example, var myvariable=5; becomes var myvariable_MODULE_ID_=5. At runtime, all _MODULE_ID_ strings in the module content are replaced at runtime with a unique id for that module, even for untrusted modules.

User preferences may be accessed from an IFRAMEd or inlined module using a preferences interface described below.

```
<script>
    // May be constructed using the ___MODULE_ID___ token. It may
    // get replaced at runtime with the actual ID of the remote module.
    var prefs = new __Container_Prefs(___MODULE_ID___);
    var someStringPref = prefs.getString("StringPrefName");
    var someIntPref = prefs.getInt("IntPrefName");
    var someBoolPref = prefs.getBool("BoolPrefName");
</script>
```

To allow both inlined and IFRAMEd modules to use the same interface to get their container dimensions (for resize events), both may be placed in an artificial <div>.

Illustrative Preference Storage

According to another embodiment of the present invention one of the elements of data stored in databases 20 may comprise preferences. In particular, for each user of the system that has a personalized container document, preferences may be stored. In addition, preferences may be stored in association with one or more modules in the personalized container of the user. According to one embodiment, the system may allocate a large volume of storage for preferences for users.

FIG. 10 illustrates an example of preferences for two users. In this example, one user, Bob Brown, which may be a username rather than a real name, has three modules designated for inclusion in his container. Each module may be identified by an identifier (e.g., a numeric identifier or index to a database where the data is stored) and a location reference. In this instance, the location reference is a URL of an XML file located at a website on the Internet. In addition, for this particular module, various preferences may be stored. In this instance, the preferences have been stored as follows: his name which equals Bob, his favorite color which equals blue, and his favorite sandwich which equals reuben. These preferences may be stored based upon the module specification for the module at www.smith.com. Specifically, the smith.com module may specify that preferences may include the name, address, and age. In one embodiment, only the preferences specified in the module specification may be stored in the preferences database. In another embodiment, all preferences that the user has provided may be stored in association with this module entry in the preferences database. For example, if the Smith.com module specification only calls for name and color preference information but used to also call for sandwich information, it is possible that the preference entry for this module may save the age information. When that information is passed to the module, the module may simply ignore that preference information because it is not used by the module. Also the system may track the preferences associated with the module and delete any preferences that have been stored in association with that module from the preference database that are no longer relevant.

As FIG. 10 illustrates, entries may be provided for each user that accesses the system to receive a personalized container. In addition, whereas this FIG. 10 illustrates that the preferences may be duplicated for each module (e.g., name equals Bob is stored in association with each of the three modules for Mr. Bob Brown) it is also possible that preferences may be stored in a global table associated with the user with references made to the modules to which they apply. Any other techniques for storing preferences in association with the various modules to be included in the container for the user may also be used within the scope of the present invention.

According to one embodiment, another security feature may be implemented with relationship to preference storage. In particular, because preference values for users may be stored for various modules, it is important that one module not be able to modify preferences to be used for other modules, unless that is desired by the users and/or module creators (e.g., two modules that operate together, such as a maps module and weather module that show a weather map imposed on a street map based on a commonly supplied user zip code preference).

Accordingly, to set preferences, in one embodiment, the module server may include a token in the IFRAME or code of a module in HTML. For an inline system, the token may comprise a digital signature since the module and user may already have been deemed to be trusted. Inlined modules may then modify other modules, the container or itself.

For IFRAMEs that may be provided on less trusted modules, the IFRAME may be served on a numeric IP address without cookies associated with the container server and any associated credentials that may be included in the cookies (in contrast to an inline presentation where any cookies set by the container are accessible to the module running inline on that page, including cookies that might include a container user identification and/or module identification).

Thus, for an IFRAME presented module, a token may be generated that includes information about the container and/or module and/or user. Thus, the IFRAME may be provided with a module identification (e.g., the index of the module being displayed) and/or a container user identification (which may be encrypted).

A token may be passed to the IFRAME and the module may then be expected to pass back that token with any request to modify, add or remove preferences. The token may be generated according to known token techniques, but one illustrative example is calculated as follows: Here K1 and K2 may be secret alphanumeric characters to the server.

Data=Encrypt$_{K1}$(Compress(ContainerUserId+ModuleId+Timestamp))

Signature=$HMAC_{K2}$(Data+ModuleUrl)

Token=Data+Signature

When a request to modify, add or remove a preference is received, the module server may decrypt the data, validate that the timestamp is within a predetermined period of time of issuance (e.g., 15 minutes), look up the container user identification and module identification, calculate the signature and encrypted data and then use the module identification to update the preferences if everything matches and all requested update parameters refer to the correct module identification. A module identification may be generated for each version of a module as well. Thus, the module location reference may not be passed in the token, but may be used in the calculation to generate the encryption (e.g., HMAC encryption).

The timestamp may be used to provide additional security. It may serve to limit the damage that could be done if an unauthorized user was able to decode the token on a particular instance. Everything in the token may be encrypted for additional safety, although lesser levels of security may also be used.

For example, JavaScript in a module may be created to programmatically store preference information for the user/module through use of the token system. Such a module may, with a valid token (e.g., within the time stamp range accepted), pass data to the preference storage without the user having to indicate. For example, a module that provides tasks for a user may automatically upload newly added tasks to the preference storage upon entry of the new task through the module. The task list then may be stored at the preference storage.

According to another illustrative example, preference information may be used to generate data from one or more remote modules and that information may then be supplied to another remote module. For example, preference information related to one or more geographic locations may be stored. Those one or more geographic locations may be provided to remote modules to generate information that may be supplied to map server 39. Map server 39 may then generate a map overlayed with data based on the geographic location information, including locations of places, images of places and the like. Also, map server 39 may obtain this information and provide it to another remote module that may generate mapping output or other output.

In one specific example, a string such as San Francisco, Calif. may be provided in preference information. That string may be converted to a geocode location using geocode server 37 and passed to a remote module. The geocode location may comprise a latitude and longitude value. The remote module may generate data for a map server to display a world map highlighting San Francisco, Calif. on the map. If other preference information, such as "restaurants", is provided, then restaurant locations near San Francisco may be shown on the map. Many other examples are certainly possible within the scope of the present invention.

Illustrative Proxy Server Collection System

According to another embodiment of the present invention, through utilizing a module that is incorporated into a container document a method for collecting data from a target site and reformatting it in a manner desired for display by the user may be realized. For example, suppose a user is an avid fan of golf and frequents a golf website regularly. But the golfer is only interested in articles and information about how to play golf and not about events related to the PGA tour and other professional golfing events. A module may be designed with a script that collects data from the golf site applying code that modifies and manipulates the data collected from the golf website to generate the data for presentation in the container. The code used by the module to collect the data from the golf website may be viewed by the golf website as a robot or other unapproved access method. This may be true particularly if the request would have been originated from a source that is unfamiliar to the golf website. For example, if the creator of such a module were a unknown operator of a website, this request may be blocked or otherwise precluded by the golf website.

The operator of the host server system may be a known entity to the individual golf site or to the community at large. Accordingly, requests for data from this site would not ordinarily be precluded. To utilize the trust associated with the container site a proxy server may be used to act on behalf of the module creator system to request the information from the golf site (e.g., the target collection site) by using a server associated with the host server system (the proxy server address). The information from the golf site may then be received by the module creator system, manipulated into a format desired by that module creator, e.g., removing all articles on a page related to the PGA tournament, highlighting information about amateur golfing, replacing names of terms in the text to suit the module creator (replacing 7 iron for mashie niblik), rearranging the content in the page to suit the module creator or any other modification, replacement, substitution, deletion, addition or action the module creator wants to apply to the data from the target collection site.

Figure 11:
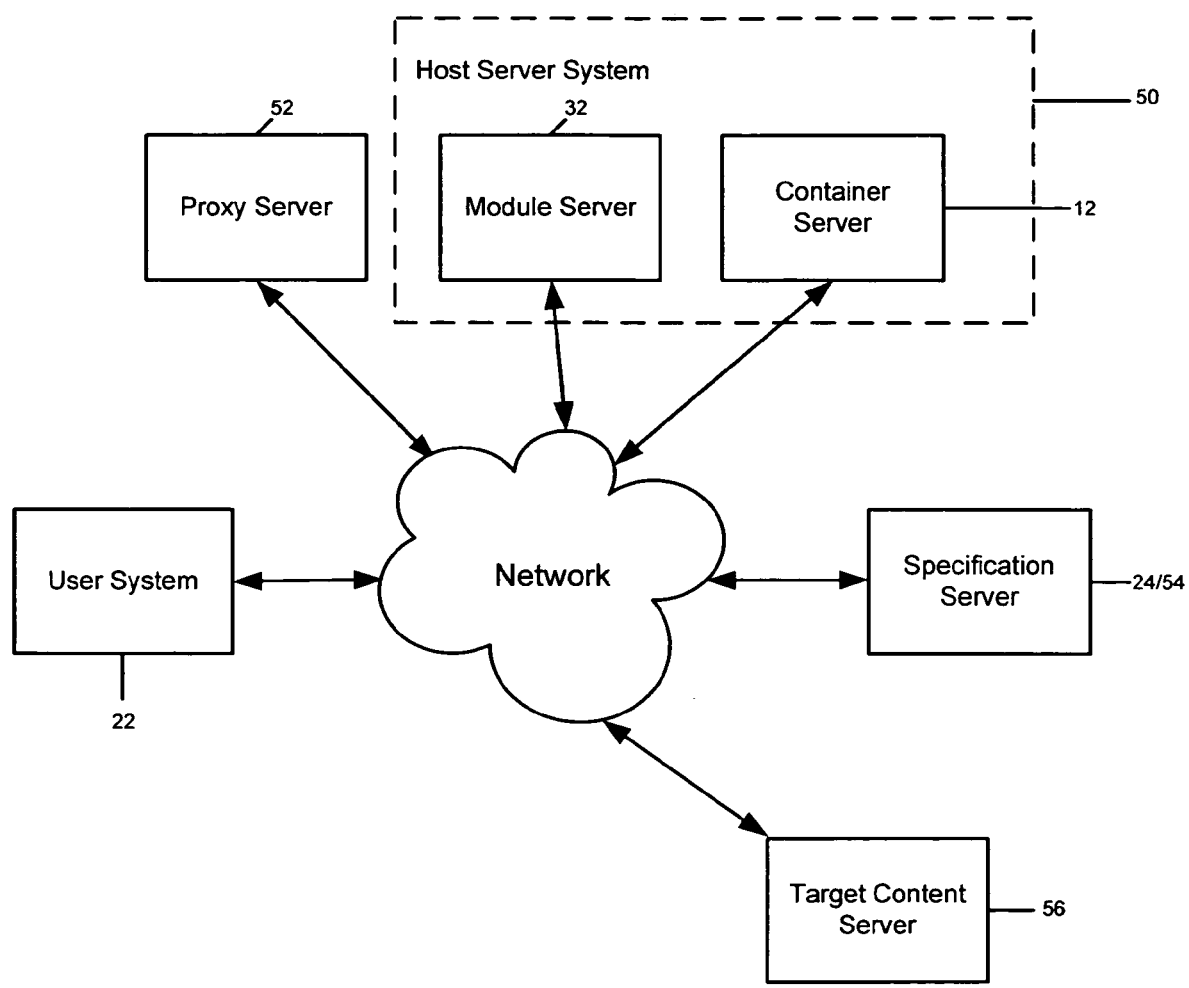
FIG. 11 depicts an illustrative system architecture according to an embodiment of the present invention.

One illustrative embodiment of such a system is depicted in FIG. 11. FIG. 11 should be understood in relation to FIG. 1 in that the placement and relationship between elements as described in relation to FIG. 1 should apply to FIG. 11 as well. As shown in FIG. 11, a proxy server 52 may be provided that may operate in conjunction with module server 32 and container server 12.

A specification server 24 may operate as the module creator system 54 as well. In addition, a target content server 56 is depicted. As discussed above, in one embodiment, a module specification may be stored in a place accessible to specification server 24. When a container is opened by container server 12, a target collection module may be identified. Module server 32 may then be called to provide the data for the module. Module server 32 may determine that the specification server is located at a location of specification server 24 on the network. The code for the target collection module may be retrieved by module server 32 from specification server 24. That code may then be delivered to container server 12 to display to the user. User system 22 may open the module and, based on code in the module data, transmit a request for data from proxy server 52 to retrieve data from target content server 56. The data from target content server 56 may be provided to proxy server 52 and then provided to the user system, where additional code in the module may modify and/or manipulate that data based on the code in the module.

Any modifications or manipulation to that data may occur at specification server 24 and then the data may be provided to module server 32 to provide to container server 12 to generate data to the user.

To avoid the proxy being used as an open proxy, which many systems on the Internet disfavor, proxy server 52 and the browser systems may employ an authentication technique, such as the use of a token, as described above related to updating preferences. Proxy server 52 may perform requests when a specified and valid token is passed from the user system, because it was part of the module code provided to the user system. In addition, caching both on the proxy server and the user system may be used to expedite delivery of data and reduce the number of calls made to the target site server.

It should be appreciated that proxy server 52 may also connect to other systems over the Internet. In one embodiment, proxy server 52 may utilize an address associated with and/or approved or authorized or certified by host server system 10 to leverage the reputation of host server system 10 so that target content server 56 may respond with data.

Figure 12:
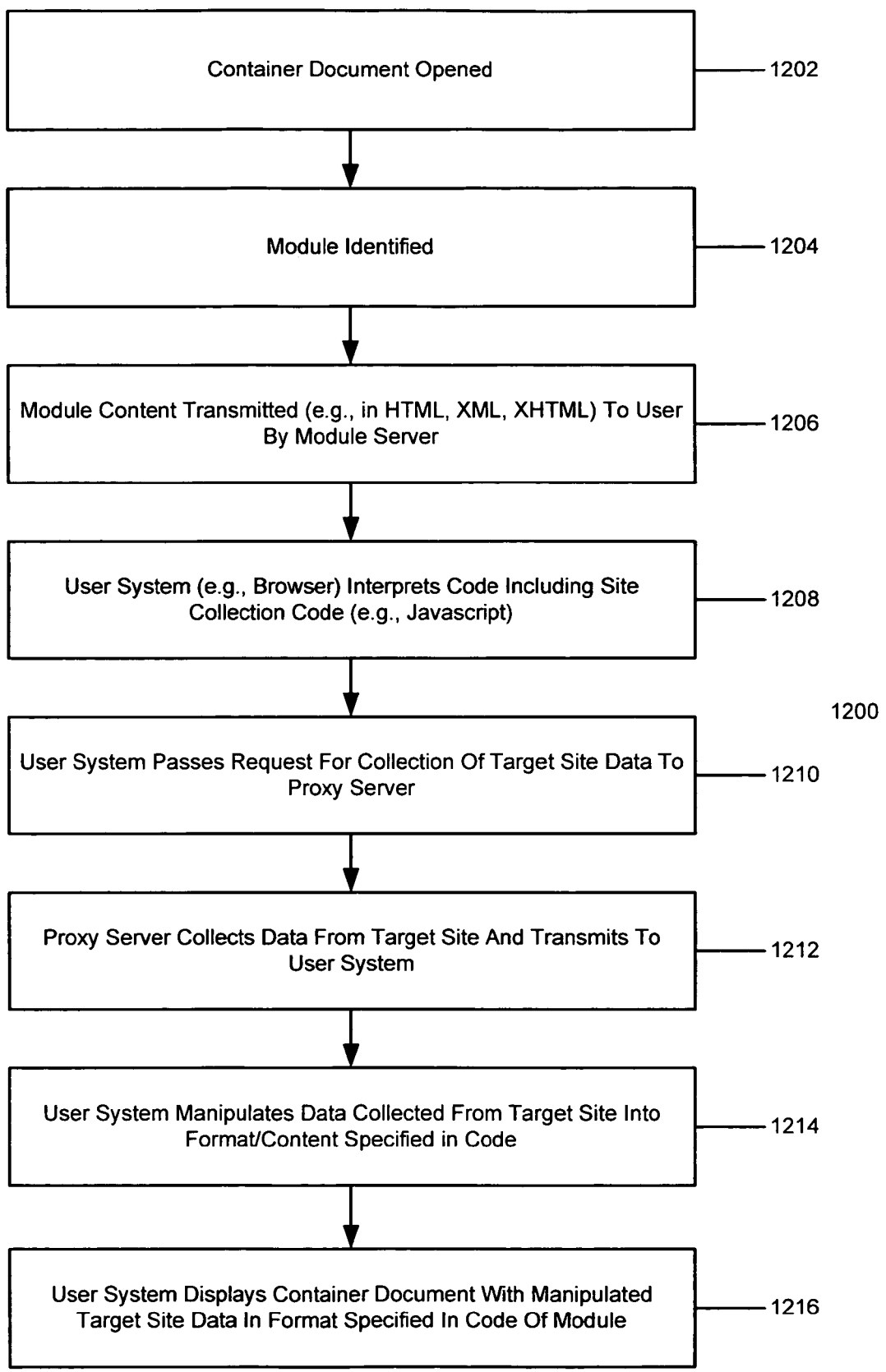
FIG. 12 depicts an illustrative process for delivering target server data from a module to a container document according to an embodiment of the present invention.

An illustrative proxy method 1200 is depicted in FIG. 12. In block 1202, a container document may be opened. In block 1204, a module may be identified that includes code to collect data from a target site. In block 1206, module content is transmitted in HTML to user by module server 32. In block 1208, a user system (e.g., a browser) interprets the HTML including the code (e.g., the JavaScript to collect and manipulate data) to collect data from the target collection site. In block 1210, the user system passes a request for collection of target site data to the proxy server. It should be noted that many browsers will not act on scripting language (e.g., JavaScript) that calls a server that is different from the server that sends the underlying HTML. Thus, because the proxy server and container server may be associated with a common source, the browser proceeds with the request.

In block 1212, the proxy server collects data from the target site and transmits it to the user system. According to one illustrative embodiment, a program referred to as trawler may be used to collect data from the target site. Such a service typically respects the so-called robot exclusion information and host load issues, similar to techniques used to cache web page data used by web search engines. In block 1214, the user system manipulates data collected from the target site based on code in the module specification and generates display data based on the manipulated target site data. In block 1216, the user system displays a container document with manipulated (optional—the data could be the target site data without manipulation) target site data in format specified by the module.

According to another embodiment, proxy server 52 may be operatively connected or include an analysis module 26 that performs the functionality described above in the context of proxy requests. For example, proxy server 52 and analysis module 26 may analyze requests against a list of disapproved sites, disapproved actions, disapproved content, etc. In addition, the requests may be compared against approved site, actions, contents. The evaluation may be based on the location reference (e.g., URL) or the target site, the format of the request, the preference values to be provided to the target site, time, user information, module specification source, requesting system or any other input.

According to other embodiments, the module specification may provide instructions that may control the proxy server. Proxy server 52 may use those instructions for operation. One instruction may indicate how the proxy server should obtain the data from a target site, such as by serving a fresh copy rather than using a cached version. Another instruction may control the cache and its operation, including indicating when the clean the cache or update the cache.

According to another embodiment, the target sites may be able to control the proxy server operations or at least provide indications as to how it would prefer that the proxy server operate. A robot exclusion file (e.g., robots.txt) may be included indicating how proxy server may operate or that the proxy server may not collect data at all. Proxy server 52 may respect instructions provided by the target site. Mega tags may also be provided by the target sites. Other manners of providing instructions may also be provided.

The instructions provided may indicate to proxy server 52 a number of things, including a refresh rate, attributes as to when or for whom proxy server 52 may collect content (e.g., a list of users, module specifications (by URL or otherwise denoted), types of data to be collected, etc.).

According to various embodiments, the modification to the data may include taking data from multiple target site sources to merge results into a module output. For example, a module may take a data feed from a news source and merge it with content from a blog into a single output. Examples may include formatting, transforming and/or reformatting RSS/Atom data feeds into an HTML output; collecting webpage HTML to create a module, e.g., for prototyping, "mashing up" content from multiple web pages and/or data feeds, applying internationalization to content, transcoding content, cleaning up "busy" content for easier presentation, including multimedia content with other forms and the like. Specific illustrative examples might include taking a RSS feed from a newspaper source, changing the font and adding the newspaper's logo; bolding headlines that mention a specific key word or phrase, including a fictional article periodically, turn placenames into mouse-over maps in data feeds, take data from a relatively active web site and create a module that contains essential links and/or features that a user selects and many more.

Figure 13:
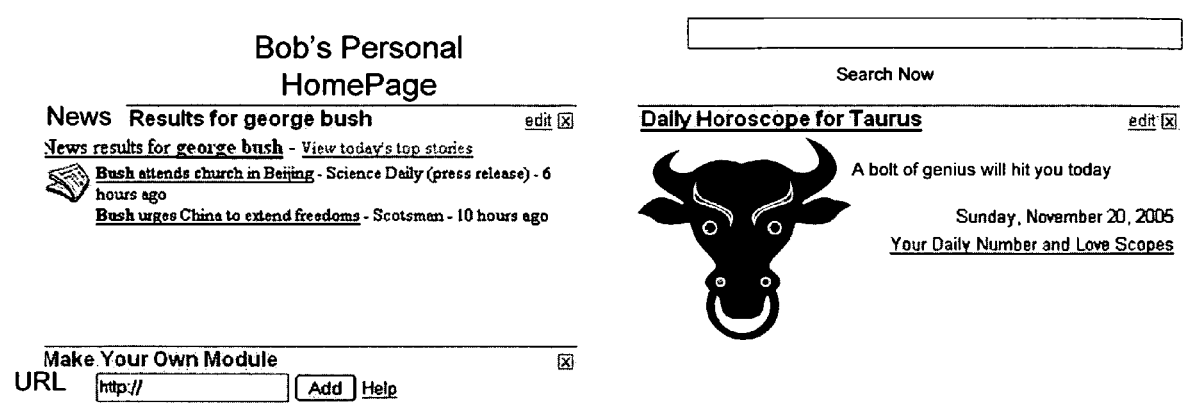

One illustrative example of a container document that includes data generated through modification of proxy data is depicted in FIG. 13. There, a horoscope module is included in the container document that includes data collected from a horoscope RSS and then modified with text specific to the user. Another proxy server example is depicted in the "news" module in which news, weather and maps may be included. Here, text from a news source has been collected with the term "George Bush" highlighted in the resulting information collected.

Through the use of a proxy server and/or process as described, various advantages may be realized. The modules may be generated for users in a way that it is readily usable by user systems, such as browsers, without a download being required (although a download of software is certainly possible within the scope of the present invention). Users may be able to discovery content through distribution of modules that incorporate them and promotion of them on various locations. Creating a module using proxy techniques may be readily done through a set of tools that the system may publish. Further, providing a scalable back-end server for proxying and storing user preferences also provides users with the benefits of these modules.

Other Illustrative Examples

Accordingly, various embodiments of the present invention enable third parties to a host server system to create modules that are used on containers served by one or more host server systems or syndicated by one or more host server systems. These modules are created according to a specification that may be easy to understand and apply. Complex modules may be possible, e.g., https, authentication, support for resizing, access to built-in libraries, etc. and remote content creators may be able to develop and debug modules without downloading or learning a software development kit (SDK). In some embodiments, a standardized platform, such as XML, may be used and thus, the actual code used may be any that may be interpreted by the user systems that eventually will display data related to the module. For example, support for JavaScript and other languages, including more and richer libraries, documentation and example modules, and better debugging facilities may be provided.

For example, code may be generated for modules that performs custom rendering for RSS/Atom feeds. RSS/Atom is a technique to publish read-only content to the web, and many modules used on container pages are often read-only with links to pages offering richer interactivity. Moreover, host server system 10 may maintain data about modules to enable reporting on their use. This may include information about each individual use of the module, history of the module, modifications to the module, syndication of the module, accounting information related to monetary values and agreements related to the module and many other types of information that may be useful for reporting on the module.

Additional module types may be created as well, including an XHTML type or modules from other systems may be possible. Additional example modules that may be created include a module that takes RSS information and renders it into a format for inclusion in a container, including data from photoblogs, for example. Other modules may include an email reader for popular web-based email systems, such as Gmail, AOL Mail, MSN Hotmail and Yahoo! Mail. A module may be created to incorporate chat data and instant messaging data. Simple applets may be incorporated into modules such as clocks, calculators, notepads and the like. Other modules may be created that operate as an interface to online marketplaces for buyers and sellers of goods, such as eBay, Amazon and other online marketplaces. Modules may also be created for internal data for various entities. For example, intranet services of an entity may be rendered into modules for inclusion in a container.

The use of these modules may involve users trading the URLs of module specs, e.g. through search engines, email, etc. In addition, an interface may be possible that allows various features to be added to a container through input of a request on another page. For example, on a golf site, there may be a link or button that says "add as a module to a container." The container may be specified in advance or may be input from the user. That link or button would be operated based on code included by the creator of the underlying page as a way to have users include that content on their container, such as their personalized home page.

In addition, an index of modules may be created through providing of module information to a search system, such as when the container document retrieves a module specification, it may be passed by the container server to the search system.

Further, a feedback module may be provided to collect feedback, statistics, and other data regarding modules, including information provided by users of modules, container document providers, target site operators and other parties involved in the system and/or network. This information and data may be presented to users through a ranking module or other module. A ranking module may rank modules based on feedback, approval, use, statistics or other criteria and may include a ranking based on user or editorial commentary.

Also, modules may be proposed based on input about the user or container page, including search history, keywords in documents viewed, etc. Other techniques may be used to promote modules for syndication as well.

In another illustrative example, a module may be created that, based on a determination that it is trusted, modify the container document to allow the user to personalize certain elements of the container document (e.g., adding the user's name, image, features, logos, etc.). Another illustrative example module may obtain a list of other modules on the container page through interaction with the container page and obtain metadata about them, including, for example, the ability to modify the module(s), obtain user preferences for them. A developer module may be developed to inline or IFRAME other modules for testing purposes, refresh modules (e.g., flush or renew caches) and other actions.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system comprising:
a container server, including a processor and a storage device, wherein the storage device includes instructions that, when executed by the processor, cause the processor to:
identify a plurality of modules selectively designated for inclusion in a container document associated with the user, wherein each of the identified modules is associated with a remote server, the container document defining an organization for a presentation of content associated with the plurality of modules in a container document display, wherein for each module a portion of the container document display is allocated for the presentation of content corresponding to the module;
transmit requests to the remote servers to retrieve module data for use in generating content for the plurality of modules;
receive module data for each of the plurality of modules in response to the requests to the remote servers, the received module data for each module including computer-executable instructions adapted for execution by a remote browser client to render content for the module for presentation in the container document display, the computer-executable instructions generated according to one or more parameters defined by the container document; and
serve the container document with module data of the plurality of modules to the remote browser client.

2. The system of claim 1 wherein module data is generated in accordance with a module specification.

3. The system of claim 2 wherein the module specification provides code to generate data for the module.

4. The system of claim 2 wherein the module specification comprises a markup language document.

5. The system of claim 4 wherein the markup language document comprises an XML document.

6. The system of claim 4 wherein the markup language document comprises an HTML file.

7. The system of claim 2 wherein the module specification is embedded within other data.

8. The system of claim 7 wherein the other data comprises a web page.

9. The system of claim 2 wherein the module specification has been altered within other data.

10. The system of claim 9 wherein the module specification has been escaped within other data.

11. The system of claim 9 wherein the module specification XML-based coding has been modified within other data.

12. The system of claim 9 wherein the alteration is detected by the container server.

13. The system of claim 12 wherein the container server generates the module specification to its intended form.

14. The system of claim 12 wherein the alteration is an escaping of XML-based code and the container server unescapes the XML-based code.

15. The system of claim 2 wherein the module specification further comprises one or more preference elements, wherein module data generated based on the module specification renders content based on the one or more preference elements.

16. The system of claim 15 wherein at least one of the preference elements relates to a characteristic of the user.

17. The system of claim 15 wherein the preference elements are based on preference data submitted by a user.

18. The system of claim 1 wherein the container server identifies modules based on a module specification location reference associated with the container document.

19. The system of claim 18 wherein the module location reference comprises a URL.

20. The system of claim 1 wherein the remote server and container server connect over the Internet.

21. The system of claim 1 wherein the container document comprises a web page.

22. The system of claim 1 wherein the container document comprises a personalized home page of a user.

23. The system of claim 1 wherein the container document comprises a portion of a web page.

24. The system of claim 1 wherein the container document comprises a toolbar element.

25. The system of claim 1 wherein the container document comprises a word processing document.

26. The system of claim 1 wherein the container document comprises a document that interprets markup language.

27. The system of claim 1 wherein the container document displays the module data inline.

28. The system of claim 1 wherein the container document displays the module data in an IFRAME.

29. The system of claim 1 further comprising an analysis server that analyses the module.

30. The system of claim 29 wherein the analysis server determines that the module is disapproved and presents the module in an IFRAME.

31. The system of claim 29 wherein the analysis server compares the module with disapproved module data.

32. The system of claim 29 wherein the analysis server analyses the module prior to use of the module with the container document.

33. The system of claim 29 wherein the analysis is performed when the container server opens the container document.

34. The system of claim 1 wherein the module specification includes a digital signature.

35. The system of claim 1 wherein the container server displays the module data inline based on the digital signature.

36. The system of claim 1 wherein the module specification includes a token.

37. The system of claim 36 wherein the container server displays the module data inline based on the token.

38. The system of claim 36 wherein the token includes a time element.

39. The system of claim 1 wherein the container document comprises an interactive media device display.

40. The system of claim 1 wherein the container document comprises a system that displays television content.

41. The system of claim 1 wherein the container document comprises a system that enables telephony communication.

42. The system of claim 1 wherein the container server is remote from a module server that obtains the module specification and provides module data to the container server.

43. The system of claim 1 wherein the container server delivers the container document to a second remote server.

44. The system of claim 43 wherein the second remote server comprises a web server serving the container document to a web user.

45. The system of claim 1 further comprising a ranking module that ranks modules.

46. The system of claim 45 wherein the ranking module provides rankings provided by users.

47. The system of claim 45 wherein the ranking module provides rankings provided by editors.

48. The system of claim 1 further comprising a feedback module that collects feedback regarding modules.

49. The system of claim 48 wherein the feedback is displayed to users.

50. The system of claim 48 wherein the feedback is used by a ranking module to rank modules.

51. A system comprising:
    container server means for identifying a plurality of modules selectively designated for inclusion in a container document associated with a user, wherein each of the identified modules is associated with a remote server including a processor and storage device, and transmitting requests to the remote servers to retrieve module data for use in generating content for the plurality of modules, the container document defining an organization for a presentation of content associated with the plurality of modules in a container document display, wherein for each module a portion of the container document display is allocated for the presentation of content corresponding to the module;
    module server means for receiving at least one module specification from a remote server and providing module data to the container server based on the at least one module specification, wherein the module data includes computer-executable instructions adapted for execution by a remote browser client to render content for the module for presentation in the container document display, the computer-executable instructions generated according to one or more parameters defined by the container document; and
    wherein the container server means serves the container document with module data to the remote browser client.

52. A computer-implemented method comprising:
    identifying by operation of a computer a plurality of modules selectively designated for inclusion in a container document associated with a user, wherein each of the identified modules is associated with a remote server, the container document defining an organization for a presentation of content associated with the plurality of modules in a container document display, wherein for each module a portion of the container document display is allocated for the presentation of content corresponding to the module;

transmitting requests to the remote servers to retrieve module data for use in generating content for the plurality of modules;

receiving, into memory, module data for each of the plurality of modules in response to the requests to the remote servers, the received module data for each module including computer-executable instructions adapted for execution by a remote browser client to render content for the module for presentation in the container document display, the computer-executable instructions generated according to one or more parameters defined by the container document; and serving the container document with module data of the plurality of modules to the remote browser client.

* * * * *

UNITED STATES PATENT AND TRADEMARK OFFICE
CERTIFICATE OF CORRECTION

PATENT NO. : 7,730,082 B2  Page 1 of 1
APPLICATION NO. : 11/298930
DATED : June 1, 2010
INVENTOR(S) : Adam Sah et al.

It is certified that error appears in the above-identified patent and that said Letters Patent is hereby corrected as shown below:

In column 29, line 18, delete "specification"

Signed and Sealed this
Twenty-ninth Day of March, 2011

David J. Kappos
*Director of the United States Patent and Trademark Office*